(12) United States Patent
Correnti et al.

(10) Patent No.: US 11,725,971 B2
(45) Date of Patent: Aug. 15, 2023

(54) DISAGGREGATION OF WATER CONSUMPTION DATA

(71) Applicant: Alarm.com Incorporated, Tysons, VA (US)

(72) Inventors: Matthew Daniel Correnti, Reston, VA (US); Robert Picardi, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 244 days.

(21) Appl. No.: 17/171,023

(22) Filed: Feb. 9, 2021

(65) Prior Publication Data

US 2021/0164823 A1    Jun. 3, 2021

Related U.S. Application Data

(63) Continuation of application No. 15/978,079, filed on May 11, 2018, now Pat. No. 10,935,405.

(60) Provisional application No. 62/505,832, filed on May 12, 2017.

(51) Int. Cl.
| | | |
|---|---|---|
| *G06Q 50/06* | (2012.01) | |
| *G01F 9/00* | (2006.01) | |
| *H04L 12/28* | (2006.01) | |
| *H04L 67/54* | (2022.01) | |
| *G01V 11/00* | (2006.01) | |

(52) U.S. Cl.
CPC .......... *G01F 9/001* (2013.01); *H04L 12/2825* (2013.01); *H04L 67/54* (2022.05); *G01V 11/002* (2013.01); *G06Q 50/06* (2013.01); *Y04S 20/30* (2013.01)

(58) Field of Classification Search
CPC ..... G01F 9/001; H04L 67/54; H04L 12/2825; G01V 11/002; G06Q 50/06; Y04S 20/30
See application file for complete search history.

(56) References Cited

U.S. PATENT DOCUMENTS

| | | |
|---|---|---|
| 8,170,695 B2 | 5/2012 | Spicer et al. |
| 9,261,863 B2 | 2/2016 | Sloop et al. |
| 9,483,737 B2 | 11/2016 | Sanchez Loureda |

(Continued)

FOREIGN PATENT DOCUMENTS

| | | |
|---|---|---|
| WO | WO2017153997 | 9/2017 |

*Primary Examiner* — Mohamed Charioui
*Assistant Examiner* — Christine Y Liao
(74) *Attorney, Agent, or Firm* — Fish & Richardson P.C.

(57) ABSTRACT

Methods, systems, and apparatus, including computer programs encoded on a storage device, for identifying one or more water dispensing appliances that are currently using water. In one aspect, the method includes actions of obtaining a dispensing appliance signature, obtaining water consumption data that is based on first sensor data from a first sensor that is installed at the property, identifying a particular water dispensing appliance from among multiple different water dispensing appliances located at the property based on an analysis of (i) the water dispensing appliance signature and (ii) the water consumption data, and responsive to identifying the particular water dispensing appliance located at the property based on an analysis of (i) the water dispensing appliance signature and (ii) the water consumption data, generating output data based on the one or more particular water dispensing appliances that were identified.

20 Claims, 10 Drawing Sheets

(56) References Cited

U.S. PATENT DOCUMENTS

| | | | |
|---|---|---|---|
| 2003/0189485 A1* | 10/2003 | Smith | G08B 21/0484 |
| | | | 340/870.16 |
| 2011/0022242 A1 | 1/2011 | Bukhin et al. | |
| 2012/0022803 A1 | 1/2012 | Donnelly et al. | |
| 2013/0289788 A1 | 10/2013 | Gupta et al. | |
| 2016/0201933 A1 | 7/2016 | Hester et al. | |
| 2017/0030798 A1* | 2/2017 | DeVerse | |
| 2017/0102162 A1* | 4/2017 | Drees | F24F 11/523 |
| 2018/0034657 A1* | 2/2018 | Brown | H04L 12/2823 |
| 2018/0144418 A1* | 5/2018 | Ravid | A61B 5/4088 |

* cited by examiner

DISAGGREGATION OF WATER CONSUMPTION DATA

CROSS-REFERENCE TO RELATED APPLICATIONS

This application is a continuation of U.S. application Ser. No. 15/978,079, filed May 11, 2018, now allowed, which claims the benefit of the U.S. Provisional Patent Application No. 62/505,832 filed May 12, 2017 and entitled "Disaggregation of Water Consumption Data." The complete disclosures of all of the above patent applications are hereby incorporated by reference in their entirety for all purposes.

BACKGROUND

Conventional property monitoring systems can be used to monitor sensor data generated by one or more sensors installed at a property. In conventional systems, the property monitoring system, when armed, can trigger an alarm in response to sensor data generated by a contact sensor, motion sensor, or a glass break sensor indicating that a potentially unauthorized person has entered the property.

SUMMARY

The present disclosure is related to a property monitoring system that can be sued to identifying one or more water dispensing appliances at a property. A water dispensing appliance may include, for example, an appliance installed at the property that is configured to consume water. Typically, water consumed by the one or more water dispensing appliances installed at the property is routed to the property via a network of one or more pipes. A particular pipe of the network of pipes can connect to the property at a metered connection point where water enters the property for routing to the one or more water dispensing appliances. This metered connection point provides a location where all water consumed by one or more water dispensing appliances installed at the property can be measured. A water dispensing appliance may include a washing machine, a dish washer, a toilet, a shower, an indoor faucet, an outdoor faucet, an irrigation system, or the like.

According to one innovative aspect of the present disclosure, a method for identifying one or more water dispensing appliances that are currently using water is disclosed. In one aspect, the method may include actions that includes obtaining, by a water meter analytics unit, one or more water dispensing appliance signatures, obtaining, by the water meter analytics unit, water consumption data that is based on first sensor data from one or more first sensors that are installed at the property, identifying, by the water meter analytics unit, one or more particular water dispensing appliances from among multiple different water dispensing appliances located at the property based on an analysis of (i) the obtained one or more water dispensing appliance signatures and (ii) the obtained water consumption data, and responsive to identifying, by the water meter analytics unit, one or more particular water dispensing appliances from among multiple different water dispensing appliances located at the property based on an analysis of (i) the obtained one or more water dispensing appliance signatures and (ii) the obtained water consumption data, generating, by the water dispensing analytics unit, output data based on the one or more particular water dispensing appliances that were identified.

Other aspects include corresponding systems, apparatus, and computer programs to perform actions of methods defined by instructions encoded on one or more computer storage devices.

These and other versions may optionally include one or more of the following features. For instance, in some implementations, the one or more water dispensing appliance signatures each include a template that describes water usage of a particular water dispensing appliance with respect to a particular time period.

In some implementations, the one or more water dispensing appliance signatures describe a water consumption curve.

In some implementations, obtaining, by the water meter analytics unit, water consumption data that is based on first sensor data from one or more first sensors that are installed at the property may include receiving, by the water meter analytics unit and from a connected water meter, data describing aggregate water consumption at the property for a particular time period.

In some implementations, the obtained water consumption data is comprised of unstructured information or a structured water consumption report.

In some implementations, identifying, by the water meter analytics unit, one or more particular water dispensing appliances from among multiple different water dispensing appliances located at the property based on an analysis of (i) the obtained one or more water dispensing appliance signatures and (ii) the obtained water consumption data may include comparing, by the water meter analytics unit, at least one of the obtained one or more water dispensing appliance signatures to the obtained water consumption data, and determining, by the water meter analytics unit and based on the comparison, whether the at least one of the obtained one or more water dispensing appliance signatures matches the obtained water consumption data within a predetermined amount of error.

In some implementations, the method may further includes responsive to determining that the at least one of the obtained one or more water dispensing appliance signatures matches the obtained water consumption data within a predetermined amount of error, determining that the water consumption at the property is the result of water consumption of a water dispensing appliance that corresponds to the at least one water dispensing appliance signature.

In some implementations, identifying, by the water meter analytics unit, one or more particular water dispensing appliances from among multiple different water dispensing appliances located at the property based on an analysis of (i) the obtained one or more water dispensing appliance signatures and (ii) the obtained water consumption data may include determining, by the water meter analytics unit and based on the obtained water consumption data, a water consumption waveform that includes an amplitude that describes the rate of water flow at the property during a particular period of time, selecting, by the water meter analytics unit and based on the one or more water dispensing appliance signatures, one or more water dispensing appliance signatures that are associated with a water consumption curve that, when aggregated, match the water consumption waveform within a predetermined amount of error, and determining, by the water meter analytics unit, that the water dispensing appliances that correspond to the selected one or more water dispensing appliance signatures are using water.

In some implementations, identifying, by the water meter analytics unit, one or more particular water dispensing appliances from among multiple different water dispensing appliances located at the property based on an analysis of (i) the obtained one or more water dispensing appliance signatures and (ii) the obtained water consumption data may include identifying, by the water meter analytics unit, one or more particular water dispensing appliances from among multiple different water dispensing appliances located at the property based on an analysis of (i) the obtained one or more water dispensing appliance signatures (ii) the obtained water consumption data, and (iii) second sensor data obtained from one or more second sensors installed at the property that are different than the one or more first sensors, wherein the one or more second sensors include one or more of a motion sensor, a contact sensor, an energy sensor, or a camera.

In some implementations, identifying, by the water meter analytics unit, one or more particular water dispensing appliances from among multiple different water dispensing appliances located at the property based on an analysis of (i) the obtained one or more water dispensing appliance signatures (ii) the obtained water consumption data, and (iii) second sensor data obtained from one or more second sensors installed at the property that are different than the one or more first sensors, wherein the one or more second sensors include one or more of a motion sensor, a contact sensor, an energy sensor, or a camera may include identifying a first candidate water dispensing appliance located in a first room of the property and a second candidate water dispensing appliance located in a second room of the property based on (i) the obtained one or more water dispensing appliance signatures and (ii) the obtained water consumption data, determining, based on the second_sensor data obtained from the one or more second sensors installed at the property, that there is a human object present in the first room and not a human object present in the second room, and responsive to a determination that there is a human object present in the first room and not a human object present in the second room, determining that the first candidate water dispensing appliance instead of the second candidate water dispensing appliance is using water.

In some implementations, generating, by the water dispensing analytics unit, output data based on the one or more particular water dispensing appliances that were identified may include generating an alert for transmission to a user device that identifies one or more water dispensing appliances located at the property that are currently using water.

These, and other innovative aspects, are described in more detail in the corresponding detailed description, drawings, and the claims.

DETAILED DESCRIPTION

Figure 1:
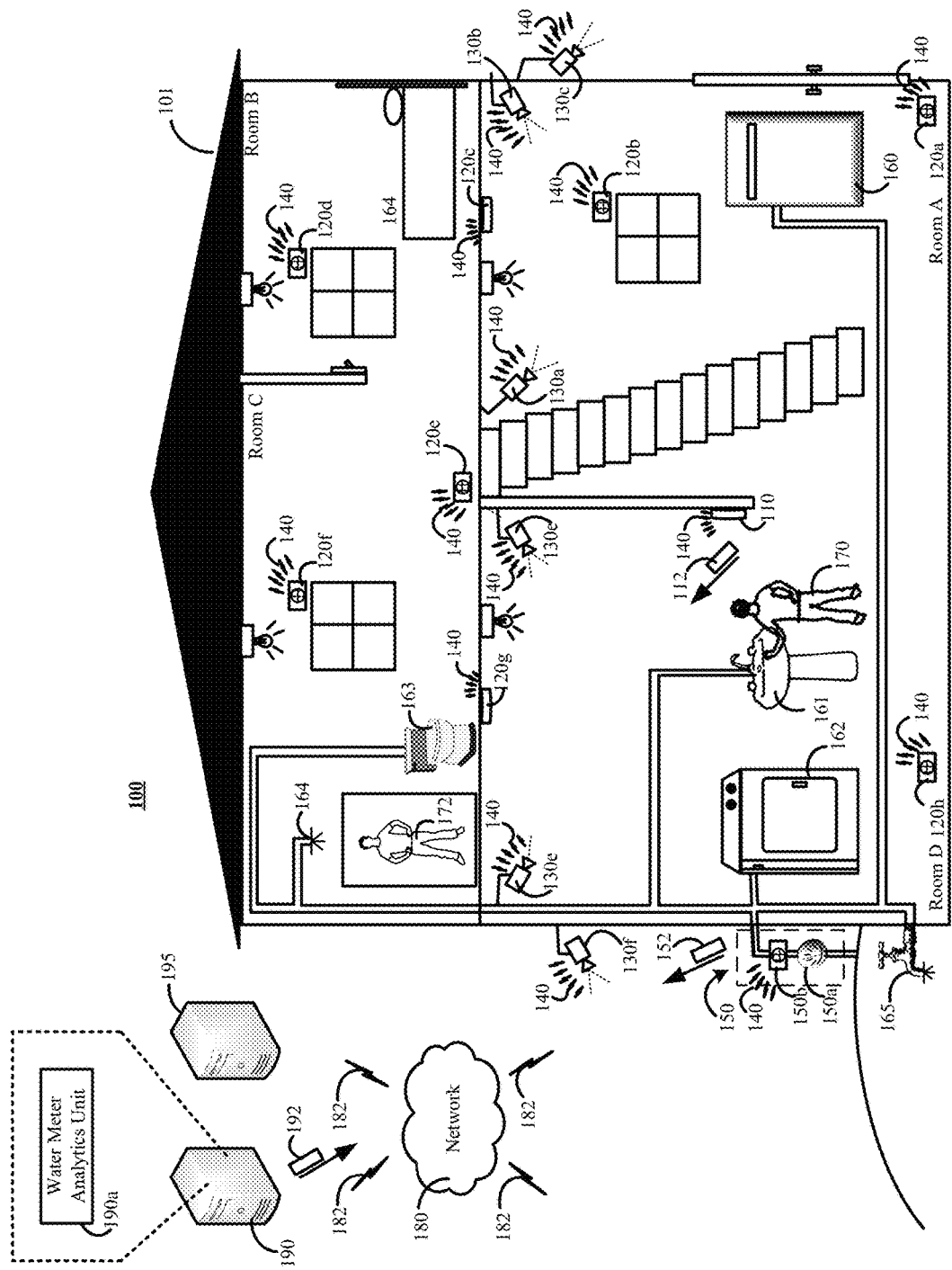
FIG. 1 is a contextual diagram of an example of a connected-home monitoring system for disaggregating water consumption data.

FIG. 1 is a contextual diagram of an example of a connected-home monitoring system 100 for disaggregating water consumption data.

The connected-home monitoring system 100 includes at least a connected water meter 150 and one or more water dispensing appliances or fixtures (hereinafter "water dispensing appliances") such as a dish washer 160, a sink 161, a washing machine 162, a toilet 163, a shower 164, and an outside faucet 165. A water dispensing appliance may include any device that uses water during its operation. The connected water meter 150 may include at least a water meter 150a and a sensor 150b. The water meter 150a may measure water usage of the property 101 in terms of a unit of volume such as liters, gallons, or the like. Data from the water meter 150a can be used by a utility company to determine a monthly water consumption total. The sensor 150b may include one or more sensors that can detect water flow and generate sensor data. The generated sensor data may represent characteristics of a property's 101 water consumption rate at a particular time. The characteristics may include a waveform indicating the shape of a water consumption curve, an amplitude of the underlying water flow rate, or the like. The generated sensor data can be used to generate periodic consumption reports.

Figure 1A:
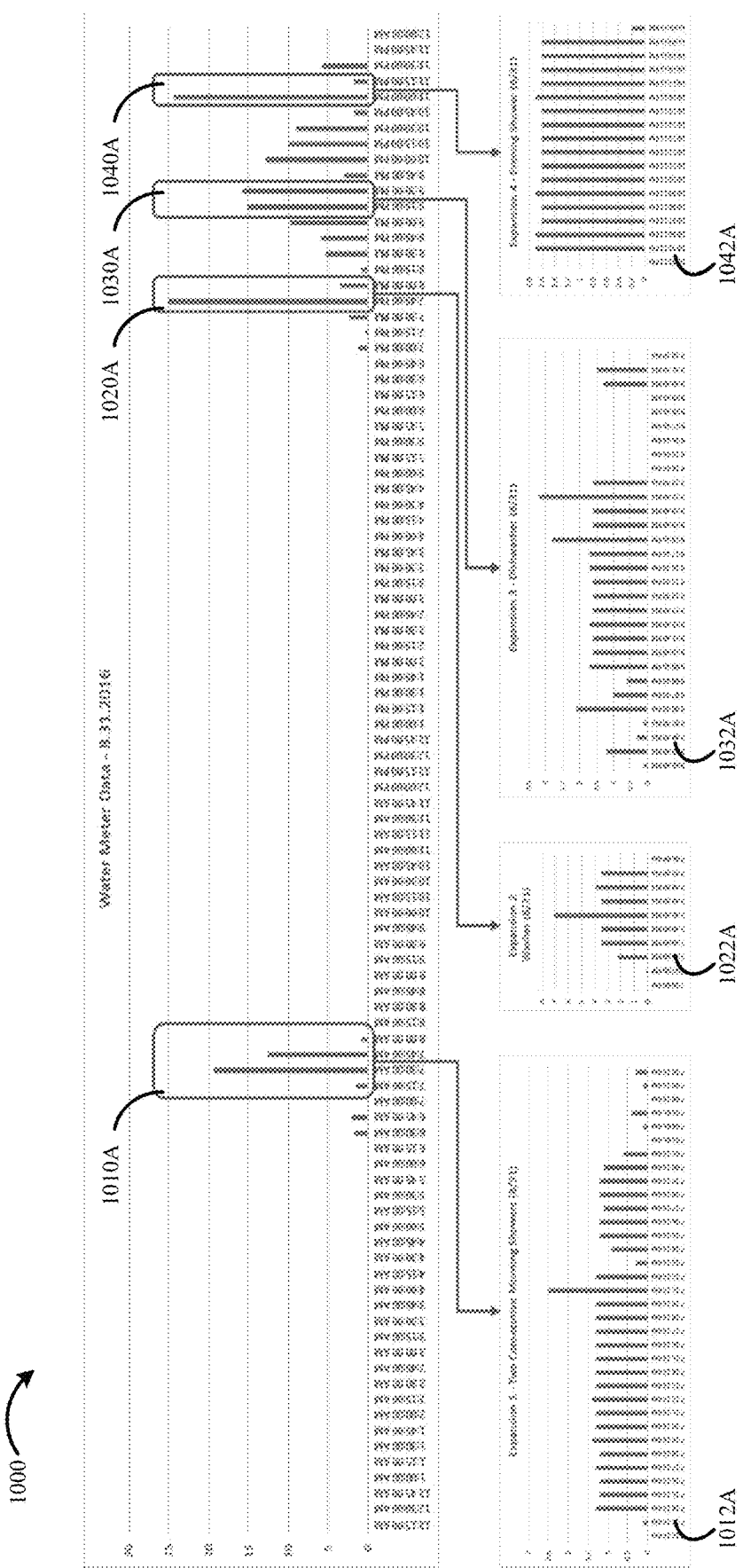
FIG. 1A depicts an example of water consumption data that includes an amplitude of the underlying water flow rate.

For example, FIG. 1A depicts an example of water consumption data 1000 that includes an amplitude of the underlying water flow rate. The water consumption data 1000 may include characteristics of water consumption related to a property occupant's two consecutive showers 1010A, characteristics of water consumption related to a washing machine 1020A, characteristics of water consumption related to a dish washing machine 1030A, and characteristics of water consumption related to an evening shower 1040A.

The water consumption data 1000 categorizes the consumption of water at a property based on the amplitude of water consumption at a property. For example, the water consumption data 1000 may measure the property's water consumption water usage and plot the measured water consumption on an x-y axis. The x-axis may be an amount of time the water was consumed and the y-axis may be a volume of water usage.

The water consumption data 1000 may be analyzed by a water meter analytics unit 190a at varying levels of granularity. For example, the water meter analytics unit 190a may drill-down into the water consumption data of each respective water dispensing device at the property identified by 1010A, 1020A, 1030A, 1040A. The water meter analytics unit 190a may drill-down into the water consumption data by projecting obtained water consumption data against one or more different time axis. For instance, characteristics of water consumption data for the property occupant's two consecutive showers for a 30 minute time period when analyzed against a time axis that is established in 15 minute increments yields the water consumption data 1010A. On the other hand, drilling-down into the same water consumption data for the same two consecutive showers projected over a different time axis yields the water consumption data 1012A. The water consumption data 1012A for the two consecutive showers may be projected across a time axis established in one-minute increments. Such a distribution of the water consumption data across a more granular time axis highlights the different amplitudes of water use that occur over a 30 minute period of water use by two consecutive showers. More granular water projections of characteristics of water consumption usage at the property for a washing machine, dishwasher, and an evening shower may also be analyzed at a different level of granularity in a similar manner as shown with respect to the display of water consumption data shown at 1022A, 1032A, and 1042A, respectively.

Figure 1B:
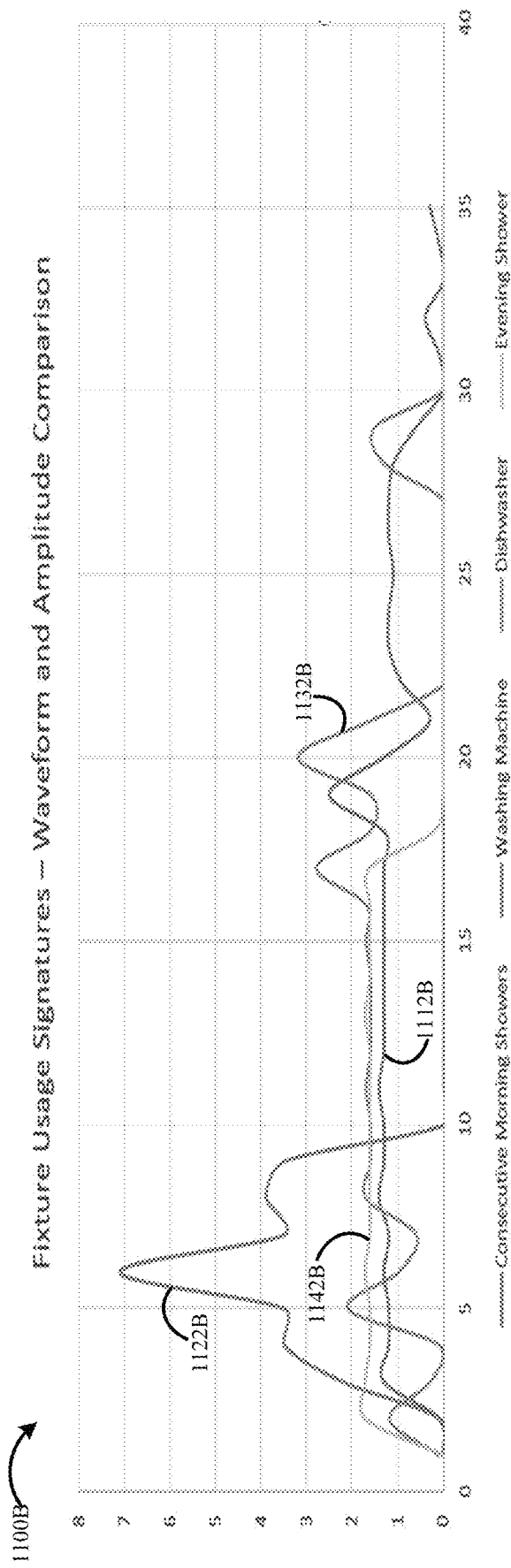
FIG. 1B depicts an example of water consumption data that includes one or more waveforms indicating the shape of one or more water consumption curves at the property.

By way of a different example, FIG. 1B depicts an example of water consumption data 1100 that includes one or more waveforms indicating the shape of one or more water consumption curves at the property. The water consumption data 1100 may include characteristics in the form of respective waveforms 1112B, 1122B, 1132B, 1142B that represent water consumption related to a property occupant's two consecutive showers (1112B), use of a washing machine (1122B), use of a dish washer (1132B), evening showers (1042B), or the like.

In some implementations, the waveforms 1112B, 1122B, 1132B, 1142B may be generated based on raw sensor data obtained from the sensor 150*b*. Alternatively, or in addition, each respective waveform 1112B, 1122B, 1132B, 1142B may be generated based on a property's water usage data that has been projected onto a time-axis with relatively short period of time increments (e.g., 1 minute, 30 seconds, 10 seconds, or the like). By way of example, each 1112B, 1122B, 1132B, 1142B may be generated based on a corresponding projection of the water consumption's amplitude onto a granular time axis shown in 1012A, 1022A, 1032A, 1042A respectively. That is the waveform 1112B corresponds to the projection of water consumption data 1012A, the waveform 1122B corresponds to the projection of water consumption data 1022A, the waveform 1132B corresponds to the projection of water consumption data 1032A, and the waveform 1142B corresponds to the projection of water consumption data 1042A.

The amplitude of the underlying water flow rate 1012A, 1022A, 1032A, 1042A, waveform indicating the shape of a water consumption curve 1112B, 1122B, 1132B, 1142B, or both may be used to identify isolated water consumption events, disaggregate overlapping water consumption events, or the like In some implementations, the connected-home monitoring system 100 may also include one or more of a monitoring system control unit 110, one or more other sensors 120*a*, 120*c*, 120*d*, 120*e*, 120*f*, 120*g*, 120*h*, one or more cameras 130*a*, 130*b*, 130*c*, 130*d*, 130*e*, 130*f*, and a network 140. The network 140 may include one or more of a LAN, a WAN, a cellular network, the Internet, or the like.

The periodic consumption reports may include data representing a water consumption at the property 101 during a particular time period. The data representing water consumption for a particular time period of the property 101 may include a waveform indicating the shape of a water consummation curve, an amplitude of the underlying water flow rate, or the like. In some implementations, the connected water meter 150 may include a computer that generates the periodic consumption report based on sensor data generated by the sensor 150*b*. In such instances, the connected water meter 150 may transmit the periodic consumption report to the monitoring application server 190 using one or more messages 152 sent via the network 140, the network 180, and one or more communication links 182.

Alternatively, a monitoring system control unit 110 may detect generated data from sensor 150*b* and generate a periodic consumption report based on the sensor data generated by sensor 150*b*. In such instances, the monitoring system control unit 110 may transmit the periodic consumption report to the monitoring application server 190 using a message 112 sent via the network 140, the network 180, and one or more communication links 182.

Alternatively, the connected water meter 150 may transmit sensor data that is generated by the sensor 150*b* to a monitoring application server 190 without first generating a periodic consumption report. In such implementations, the sensor data generated by the sensor 150 may be transmitted directly to the monitoring application server 190 using network 140, network 180, and one or more communication links 182. In other implementations, the sensor data generated by the sensor 150*b* may be transmitted indirectly to the monitoring application server 190 by relaying sensor data generated by the sensor 150*b* through the monitoring system control unit 110 to the monitoring application server 190 using network 140, network 180, and one or more communication links 182.

In some implementations, sensor data generated by the sensor 150*b*, periodic consumption reports, or the like may be transmitted to the monitoring application server only in response to the detection of water usage. For example, a periodic consumption report may be generated that aggregates water consumption data for a predetermined time period after a period of water usage ends. Then, the generated period consumption report generated and transmitted in response to the detection of water consumption, completion of a period of water consumption, or the like as opposed to continuously reporting water consumption data for a property. Such measures can help reduce the use of network bandwidth by transmitting data across the network less frequently.

The monitoring application server 190 may receive one or more messages such as message 152 or 112 that includes water consumption data such as a periodic consumption report. Alternatively, the monitoring application server 190 may receive one or more messages that include water consumption data such as sensor data generated by one or more sensors such as sensor 150*b*, and then generate a periodic consumption report based on the generated sensor data. The monitoring application server 190 may then analyze one or more periodic consumption reports for a property 101 using a water meter analytics unit 190*a*. In yet other implementations, the monitoring application server 190 may receive and analyze water consumption data such as sensor data generated by one or more sensors such as sensor 150*b* that has not been transformed into a periodic consumption report.

The water meter analytics unit 190*a* may analyze water consumption data such as periodic consumption report in order to identify the one or more types of water dispensing appliances that dispensed water during the time period associated with the period consumption report. The water meter analytics unit 190*a* analyze water consumption data in a particular way based on the type of water consumption events are associated with the water consumption data. For example, the water meter analytics unit 190*a* may perform an isolated events analysis, an overlapping events analysis, or the like.

The water meter analytics unit 190*a* may analyze water consumption data such as periodic consumption reports for isolated events using a set of known water dispensing appliance signatures. A water dispensing appliance signature may include a profile of a particular water dispensing appliance's water usage. In some instances, the water dispensing appliance signature may be based on a particular amount of water usage with respect to a particular time period. A water dispensing appliance signature may be associated with a waveform (e.g., shape of a water consumption curve) and an amplitude (e.g., underlying flow rate of the water). Each respective water dispensing appliance signature may also be associated with a predetermined amount of error to capture differences in waveform or amplitude that may exist from a first water dispensing appliance to second water dispensing appliance of the same, or similar, make, model, type, or the like. A water dispensing appliance signature is a "known" water dispensing appliance signature if the water meter analytics unit 190*a* has associated the particular water dispensing appliance signature with a particular water dispensing appliance. The water meter analytics unit 190*a* may have access to a database of known water dispensing appliance signatures that serve as templates associating a particular water dispensing appliance type with a particular water dispensing appliance signature. In some implementations, the system may maintain a property-specific database of known water dispensing appliance signatures for each known property.

The water meter analytics unit 190*a* may analyze water consumption data using of a database of known water dispensing appliance signatures to identify isolated water consumption events. An isolated water consumption event may include water use by a water dispensing appliance that does not overlap with water use by any other water dispensing appliance installed in the property 101. In response to determining that water consumption data includes an isolated event, the water meter analytics unit 190*a* may generate an unknown water dispensing appliance signature for the isolated water consumption event. The unknown water dispensing appliance signature may be compared to one or more signatures in the database of known water dispensing appliance signatures.

If the match within a predetermined amount of error is identified between the unknown water dispensing appliance signature and a known water dispensing appliance signature, the water meter analytics unit 190*a* may determine that the unknown water dispensing appliance signature corresponds to the appliance type that is associated with the known water dispensing appliance signature. In such instances, the water meter analytics unit 190*a* may store data that associates the corresponding appliance type with a property such as property 101 where the corresponding appliance type resides. In some implementations, the monitoring application server 190 may transmit a message 192 to the one or more components of the connected-home monitoring system 100, a user device of an occupant 170, 172, or the like that includes information related to the corresponding appliance type. Information related to the corresponding appliance type may include, for example, information indicating that the particular water dispensing appliance type is currently running water, is not currently running water, is using water in an inefficient manner, is using water efficiently, is potentially malfunctioning, or the like. Alternatively, or in addition, the information related to the corresponding appliance type may include marketing information for a product that can be used with the corresponding appliance type, suggested replacements for the corresponding appliance type, or other forms of marketing information.

Alternatively, if a match within a predetermined amount of error cannot be identified between an unknown water dispensing appliance signature and a known water dispensing appliance signature, then further analysis of the unknown water dispensing appliance signature may be performed. For example, review and analysis of the unknown water dispensing appliance signature may be performed by a human user in an effort to determine a water dispensing appliance type that is associated with the unknown water dispensing appliance signature.

In some implementations, the water meter analytics unit 190*a* may associate a known water dispensing appliance signature with a water dispensing appliance type via a registration process. For example, an occupant of a property 101 such as occupant 170 may install a new sink 161. After installing the sink 161, the occupant 170 may register the new sink 161 with a registration service provided by a service provider of the connected-home monitoring system 100. The server provider may then obtain a known water dispensing appliance signature that is associated with the sink 161, and store the known water dispensing appliance signature in a database of known water dispensing appliance signatures associated with the property 100.

The water meter analytics unit 190*a* may also analyze water consumption data associated with overlapping events using disaggregation techniques. An overlapping event may include, for example, a water consumption event where two or more water dispensing appliances are using water during the same period of time. The water meter analytics unit 190*a* may disaggregate an overlapping event by iteratively analyzing water consumption data that is indicative of characteristics of water usage of a property for a particular period of time. The data indicative of characteristics of water usage for a particular period of time may include data describing a waveform representing the shape of a water consummation curve of the known water consumption appliance, data describing an amplitude of the underlying water flow rate of the known water consumption appliance, or the like. Then, the water meter analytics unit 190*a* may perform an iterative process to reverse engineer the aforementioned waveform, the aforementioned amplitude, or both, for a particular time period by iteratively evaluating one or more combinations of two or more known water dispensing appliance signatures associated with the property 101 and stored in a water dispensing appliance signature database.

In some implementations, the water meter analytics unit 190*a* may intelligently select the two or more known water dispensing appliance signatures for use in reverse engineering the aforementioned waveform, the aforementioned amplitude, or both, associated with a property's 101 water consumption for a particular time period. In some implementations, intelligently selecting two or more water dispensing appliance signatures for use in reverse engineering the aforementioned waveform may include identifying a subset of known water dispensing signatures that can be used to reverse engineer the waveform. Identifying a subset of known water dispensing appliance signatures may include removing one or more known water dispensing appliance signatures from consideration during the iterative reverse engineering process. For example, the water meter analytics unit 190*a* may remove from consideration each water dispensing appliance signature that is associated with an amplitude that is greater than the aggregate amplitude of the water consumption data associated with the overlapping event. This intelligent selection of known water dispensing appliances signatures may reduce the number of iterations required to reverse engineer an overlapping event.

Alternatively, or in addition, the water meter analytics unit 190a may eliminate one or more water dispensing appliance signatures from consideration during the iterative process based on the current state of the connected-home monitoring system 100 depicted in FIG. 1. For example, the connected-home monitoring system depicted by FIG. 1 may be in an armed-away state. An armed away state may include, for example, an arming of the connected-home monitoring system 100 to a monitoring configuration that includes a number of predetermined settings that can monitor the property 101 during a period of time when each occupant of the property 101 is away from the property 101. In such instances, the connected-home monitoring system 100v can know that there are no occupants at home using a water dispensing appliance. Accordingly, known water dispensing appliance signatures for water dispensing appliances such as a sink 161, a shower 164, or the like can be removed from the subset of known water dispensing appliance signatures that will be used to reverse engineer an overlapping water consumption event that is identified by the connected water meter 150, the water meter analytics unit 190a, or both. Instead, known water dispensing appliance signatures for water dispensing appliances that can use water while a property occupant is away from the property may initially be relied on to reverse engineer an overlapping event. For example, known water dispensing signatures for a dish washer 160, a washing machine 162, an outdoor irrigation system, or the like may initially be used to reverse engineer an overlapping water consumption event with a connected-home monitoring system 100 in an armed-away state. This intelligent selection of known water dispensing appliance signatures may reduce the number of iterations required to reverse engineer an overlapping event.

Figure 2:
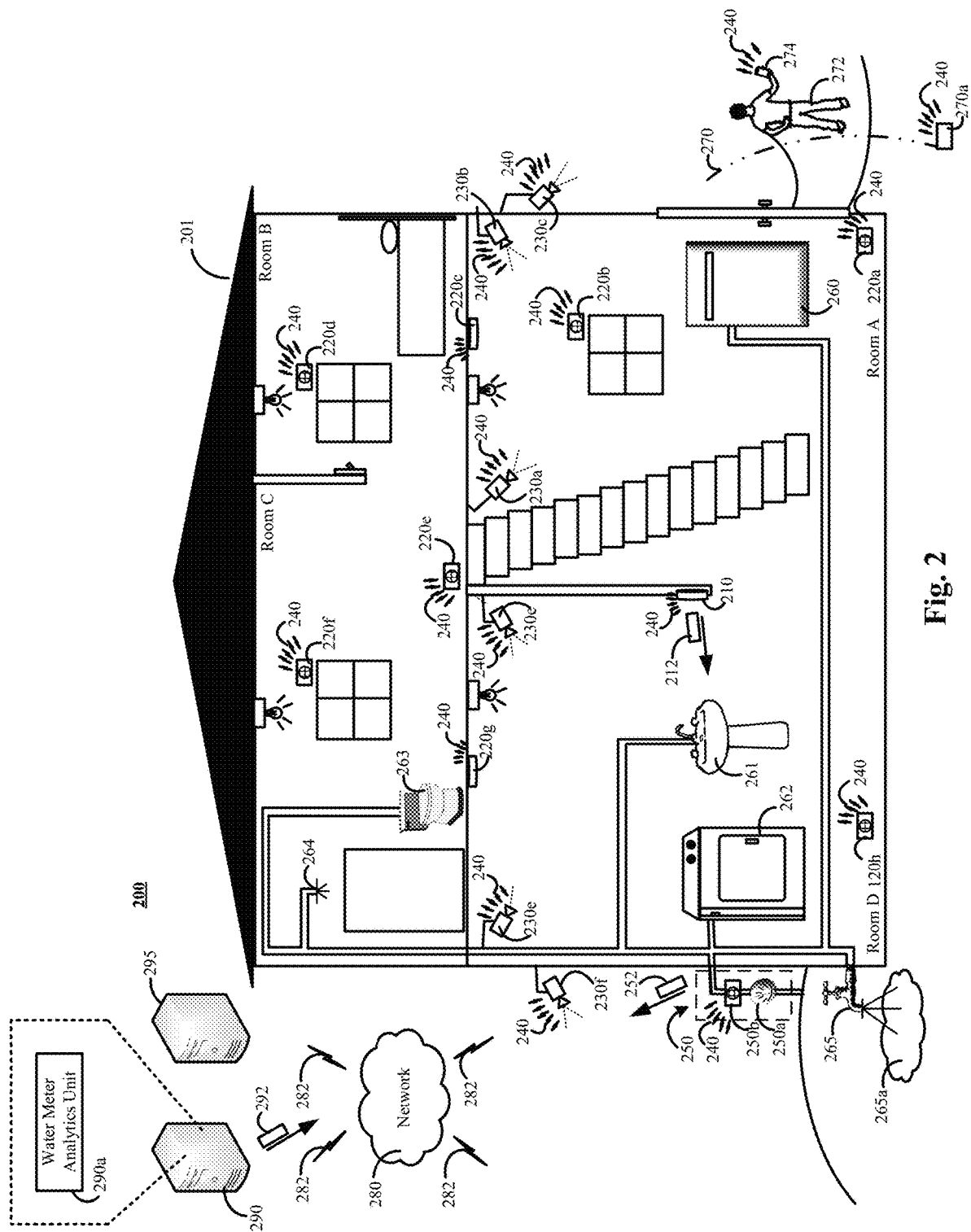
FIG. 2 is a contextual diagram of an example of a connected-home monitoring system that generates notifications based on data collected by a connected water meter.

FIG. 2 is a contextual diagram of an example of a connected-home monitoring system 200 that generates notifications based on data collected by a connected water meter.

The connected-home monitoring system 200 is substantially similar to the connected-home monitoring system 100 described above. However, the connected-home monitoring system 200 may also employ a geo-fence 270.

The geo-fence 270 can be configured to set up a non-physical boundary that surrounds the property 201. The geo-fence can be configured in a number of ways. For example, the geo-fence 270 may be configured using location tracking technologies that include GPS technologies, RFID technologies, motion sensors, IR sensors, a combination thereof, or the like. The location tracking technologies that are used to establish the geo-fence 270 may be associated with one or more computing devices 270a that are configured to generate data when a person 272 crosses the boundary established by the geo-fence 270. The data generated in response to the person 272 crossing the geo-fence 270 can be detected by one or more components of the connected-home monitoring system 200 such as the monitoring system control unit 210. The monitoring system control unit 210 may use the data generated in response to the person 272 crossing the geo-fence and one or more other sensors within the connected-home monitoring system 200 such as motion sensors to determine whether the person 272 is the last property occupant, last adult property occupant, or the like to leave the property 201. The monitoring system control unit 210 may perform one or more operations in response to the detected data that indicates that a person 272 has crossed the boundary established by the geo-fence 270. In some implementations, the one or more operations may only be performed if the person 272 that crossed the boundary established by the geo-fence 270 is the last occupant of the property 201, the last adult occupant of the property 201, or the like.

In some implementations, the water meter analytics unit 290a may monitor the current water usage of each of the one or more water dispensing appliances installed in a property 201 and transmit notifications to a user device 274 based on data detected during the monitoring. The water meter analytics unit 290a may be configured to notify a person 272 that a first set of one or more water dispensing appliances are currently using water, are not currently using water, or the like in response to one or more events detected by the connected-home monitoring system 200 such as the person 272 crossing a geo-fence 270.

In some implementations, the monitoring system control unit 210 may detect data generated by a computing device 270a indicating that a person 272 has crossed a predetermined boundary established by a geo-fence 270. In response to detecting the data generated by the computing device 270a and one or more other sensors such as motion sensors inside the property 201 indicating that the person 272 is the last occupant of property 201, last adult occupant of property 201 or the like, the monitoring system control unit 210 may generate a message 212 that instructs the connected water meter 250 to transmit water consumption data to the monitoring application server 290 using the network 240, the network 280, one or more communication links 282, or a combination thereof. Alternatively, the monitoring application server 290 may request water consumption data from the connected water meter 250 in response to receiving data indicating that the person 272 crossed the boundary established by the geo-fence 270. Alternatively, the monitoring application server 290 can analyze the most recently received water consumption data for the property 201 in response to receiving data indicating that the person 272 crossed the boundary established by the geo-fence 170.

The water meter analytics unit 290a may analyze the water consumption data using the techniques described with reference to FIG. 1 above to determine if any isolated consumption events exist, disaggregate any overlapping consumption events, or the like to determine whether one or more water dispensing appliances 260, 261, 262, 263, 264, 265 are using water. In response to determining that one or more water dispensing appliances 260, 261, 262, 263, 264, 265 are using water, the water meter analytics unit 290a may determine whether the person 272 should to be notified regarding the water use by each of the one or more water dispensing appliances 260, 261, 262, 263, 264, 265. In some implementations, the water meter analytics unit 290a may determine that a person 272 should be notified regarding the water use by one or more of the water dispensing appliances 260, 261, 262, 263, 264, 265 when the person 272 crosses the geo-fence 270. In response to determining that the person 272 should be notified regarding the water use of one or more dispensing appliances 260, 261, 262, 263, 264, 265 using water when the person 272 crosses the geo-fence 270, the water meter analytics unit 290a may generate and transmit a notification 292 that can be delivered to the person's 272 device 274 via the network 280, one or more communications links 282, the network 240, a combination thereof, or the like. The notification 292 may be received by the device 274, and data may be output for display on the user interface of the device 274 based on the received notification 292. The person 272 may review the displayed data associated with the notification, and re-enter the property 201, if necessary, to turn off the one or more water dispensing appliances identified by the notification as currently using water.

By way of example with reference to FIG. 2, the monitoring system control unit 210 may detect data generated by the computing device 270a indicating that the person 272 has crossed the predetermined boundary established by the geo-fence 270. The monitoring system control unit 210 may transmit a message 212 to the connected water meter 250. The message 212 may instruct the connected water meter 250 to transmit a message 252 that includes current water consumption data for the property 201 to the monitoring application server 290. The monitoring application server 290 may receive the message 252, and then use the water meter analytics unit 290a to analyze the received water consumption data. The water meter analytics unit 290a may determine, based on a type of water dispensing appliance that is using water when the occupant 272 crosses a boundary line established by the geo-fence 270, whether to notify an occupant 272n of the property 201 that the water dispensing appliance is using water.

The type of water dispensing appliance may be determined by accessing stored water dispensing appliance metadata that categorizes water dispensing appliances based on usage type. For example, some water dispensing appliances may be permitted to use water regardless of the property occupant's 272 location. That is, the water dispensing appliances can use water when the property occupant 272 is at the property 201 or when the property occupant 272 is away from the property 201. Alternatively, other water dispensing appliances may only be permitted to use water when a property occupant 272 is located at the property 201. The water meter analytics unit 290a may access the stored water dispensing appliance metadata indicating whether the water dispensing appliance is of the type that can use water when the property occupant 272 (e.g., all property occupants, all adult property occupants, or the like) is away from the property 201.

In example of FIG. 2, the water meter analytics unit may determine that the dishwasher 260 is using water and that the outdoor faucet 265 is using water. The water meter analytics unit 290a may access and analyze stored water dispensing appliance metadata to determine that the dishwasher can use water when no occupant of the property 201 is present. However, the water meter analytics unit 290a may also access and analyze stored water dispensing appliance metadata to determine that the outdoor faucet 265 should not be using water when no one is located at the property 201, when no adult of the property is located at the property 201, or the like. This is because, for example, if left unsupervised, the faucet 265 may result in water 265a needlessly being dispensed onto the grounds of the property 201, cause damage to surrounding landscape, flood a basement of the property 201, or the like. In such instances, the water meter analytics unit 290a may generate a message 292, and transmit the message 292 to the device 274. The message 292 may include instructions that cause the device 274 to display an alert on the user interface of the device 274 indicating that the faucet 265 is using water. The person 272 can review the alert, circle-back to the faucet 265, and turn the faucet 265 off. The message 292 may include an alert that is designed to get the property occupant's 272 attention. The alert may include an audible alert, a visual alert, a tactile alert, or the like.

On the other hand, the water meter analytics unit 290a may not be configured to generate a message 292 to notify the person 272 that the dishwasher 260 is using water when the person 272 has crossed the boundary established by the geo-fence 270. This is because the dishwasher 260 may be categorized as a type of water dispensing appliance that can be configured to use water when an occupant of the property 201 is not on the premises of the property 201.

In some implementations, however, the property occupant 272 may be permitted to customize which types of water dispensing appliances should trigger notifications regarding the water dispensing appliance's water use. For example, the property occupant 272 may access a user portal via one or more networks that allows the property occupant to change water dispensing appliance metadata for a water dispensing appliance from a first device type that is allowed to use water when the property occupant is not located at the property to a second device type that is not allowed to use water when the property occupant is not located at the property, or vice versa.

The example of FIG. 2 provides for a specific type of notification that may be generated and transmitted to a property occupant that has crossed a boundary established by a geo-fence. 270. However, other notifications may be generated, or other inferences may be made, by one or more components of the connected-home monitoring system 200 based on data collected by a connected water meter 250.

For example, in some implementations, water consumption data collected by a connected water meter 250, and then transmitted to a monitoring application server 290. The monitoring application server 290 may analyze the received water consumption data using a water meter analytics unit 290a. In some instances, the water meter analytics unit 290a may detect the use of water by a particular water dispensing appliance. For example, the water meter analytics unit 290a may determine that a property such as property 201 has an irrigation system installed. The irrigation system may be detected by analyzing water use that occurred during an isolated consumption event, disaggregating water use by multiple water dispensing appliances that occurred during an overlapping consumption event, or the like as described with reference to FIG. 1.

In response to detecting that a property has an irrigation system, the water meter analytics unit 290a (or some other components of connected-home system 200) can take one or more actions to market products to a property 201 occupant, owner, or the like. For example, the water meter analytics unit 290a (or some other components of connected-home system 200) can generate and transmit notifications to a property occupant associated with the property for a connected-solution for operating, managing, maintaining, or the like the irrigation system installed at the property 201. The message may include one or more notifications sent to a smart phone associated with the property 201 occupant, owner, or the like, emails, internet browser banner ads, browser pop-up ads, mobile application ads, paper mailers, robo-calls, or the like. Alternatively, the water meter analytics unit 290a (or some other components of connected-home system 200) may provide data to a third party indicating that the property 201 includes an irrigation system. In such instances, the third party may perform marketing operation directed towards a property 201 occupant, owner, or the like in order to market products that may be used with the irrigation system. Marketing efforts employed by the third party may include notifications sent to a smart phone associated with the property 201 occupant, owner, or the like, emails, internet browser banner ads, browser pop-up ads, mobile application ads, paper mailers, robo-calls, or the like. Though an irrigation system was used in the example above, the present disclosure need not be so limited. For example, the water analytics unit 290a can be used to detect the presence of any type of water dispensing appliance in the property based on the detected water usage of the property such as showers, bathtubs, dishwashers, washing machines, or the like.

By way of another example, the connected-home system 200 may be used to provide an indication of a change in occupancy of a property 201. For example, the connected water meter 250 may provide water consumption data to a monitoring application server 290 that indicates a drop in water consumption. For instance, the water consumption data may indicate that the water consumption at a particular property such as property 201 is near zero liters, zero gallons, or the like. Alternatively, a connected water meter 250 may stop reporting water consumption data because no water is being used at the property 201. In such instances, data indicating a lack of water consumption at a property such as property 201 may indicate that the property 201 occupant, owner, or the like is on vacation, moving to a different property, or the like. The monitoring application server may include one or more units, modules, or the like that can then make recommendations to one or more parties based on the fact that the property 201 occupant, owner, or the like is on vacation, moving to a different property, or the like.

Other types of notifications may be generated based on the lack of water consumption at a particular property. For example, the monitoring application server may analyze water consumption data for a particular property over a particular time period. The monitoring application server may analyze isolated events, disaggregate overlapping events, and the like and determine which particular water dispensing appliances have used water during the time period, the last time a particular water dispensing appliance was used, and the like. In such instances, the monitoring application server may be configured to generate and transmit notifications to a user device based on determining that one or more water dispensing appliances at a property have not been used for more than a predetermined period of time. For example, a person may use a web portal, mobile application, or the like to establish a rule for generating a water usage notification. Using the web portal, mobile application, or the like the person may configure the monitoring application server to, for example, generate and transmit a notification if the shower in their elderly parent's home has not been used for more than one week. In accordance with such an example, the monitoring application server may obtain and analyze water consumption data from the elderly parent's home using the techniques described herein. Then, in response to a determination by the monitoring application server, based on the water consumption data from the elderly parent's home, that the shower in the elderly parent's home has not been turned on for more than one week, the monitoring application server may transmit a notification to the person's user device notifying the person that their elderly parent has not taken a shower in more than one week.

In some implementations, a determination by the connected-home system 200 that the property 201 occupant, owner, or the like is moving to a different residence may be supported by the detection of movement within the property 201 and lack of water consumption. Such data may indicate that prospective buyers, prospective renters, a realtor, or the like has been through, but are not living in, the property.

By way of yet another example, in some implementations, water consumption data may be collected by a connected water meter 250, and then transmitted to a monitoring application server 290. The monitoring application server 290 may analyze the received water consumption data using a water meter analytics unit 290a. In some instances, the water meter analytics unit 290a may detect that a particular water dispensing appliance is inefficient, malfunctioning, or the like. For example, the water meter analytics unit 290a may determine that a property such as property 201 has a standard washing machine. In such instances, the water analytics unit 290a (or other unit, module, or the like on the server 290) may transmit a notification to the property 201 owner, occupant, or the like marketing a higher efficiency washing machine. Alternatively, or in addition, the water analytics unit 290a (or other unit, module, or the like on the server 290) may determine that a dish washer at property 201 is malfunctioning. In such instances the water meter analytics unit 290a may transmit a notification to the property 201 owner alerting the property 201 owner, occupant, or the like that the dish washer needs servicing.

Instances of low efficiency, potential malfunctions, or the like may be determined based on the processes described with respect to FIG. 1. For example, the water meter analytics unit 290a may determine a water dispensing appliance signature for a water dispensing appliance type installed at the property 201. Then, the water dispensing appliance signature can be compared to high-efficiency water dispensing appliance signatures. The differences in the signature can indicate whether the property 201 does, or does not, include a high-efficiency water dispensing appliance. If the property 201 is determined to have a low-efficiency device, then high-efficiency devices may be marketed to the property 201 occupant, owner, or the like. One or more units, modules or the like installed on monitoring application server 290 may market high-efficiency devices to the property 201 occupant, owner, or the like. Alternatively, the monitoring application server 290 may provide data indicating the particular type water dispensing data utilized at the property 201 to a third party such as a utility company. Then, the utility company can market particular types of water dispensing appliances (e.g., high-efficiency devices) to a property 201 occupant, owner, or the like in an effort to suggest ways for the property 201 occupant, owner, or the like to reduce their water bill, power bill, or the like.

The water meter analytics unit 290a may also determine, based on received water consumption data that a water dispensing appliance is malfunctioning. For instance, the water meter analytics unit 290a may store water consumption data associated with each water dispensing appliance in a property 201 over a period of time. The water meter analytics unit 290a can compare new water consumption data associated with a particular water dispensing appliance to historical data for the same water dispensing appliance. If, based on the comparison, the water meter analytics unit 290a determines a degradation in performance of the water dispensing appliance (e.g., the water dispensing appliance is starting to use more water to perform the same tasks, the water dispensing appliance is using less water to perform the same tasks, or the like), then the water meter analytics unit 290a can determine that the water dispensing appliance may be malfunctioning. In such instances, the water meter analytics unit 290a (or some other unit, module, or the like of monitoring application server 290) may generate and transmit a notification to a user device of a property 201 occupant, owner, or the like that suggests getting the water dispensing appliance serviced. Alternatively, or in addition, the notification may suggest that the property 201 occupant, owner, or the like needs to purchase a new water dispensing appliance. Alternatively, or in addition, the notification may suggest to the property 201 occupant, owner, or the like that the water dispensing appliance may be malfunctioning.

The connected-home monitoring system 200 that utilizes a connected water meter 250 may be used for at least these, and other, applications.

Figure 3:
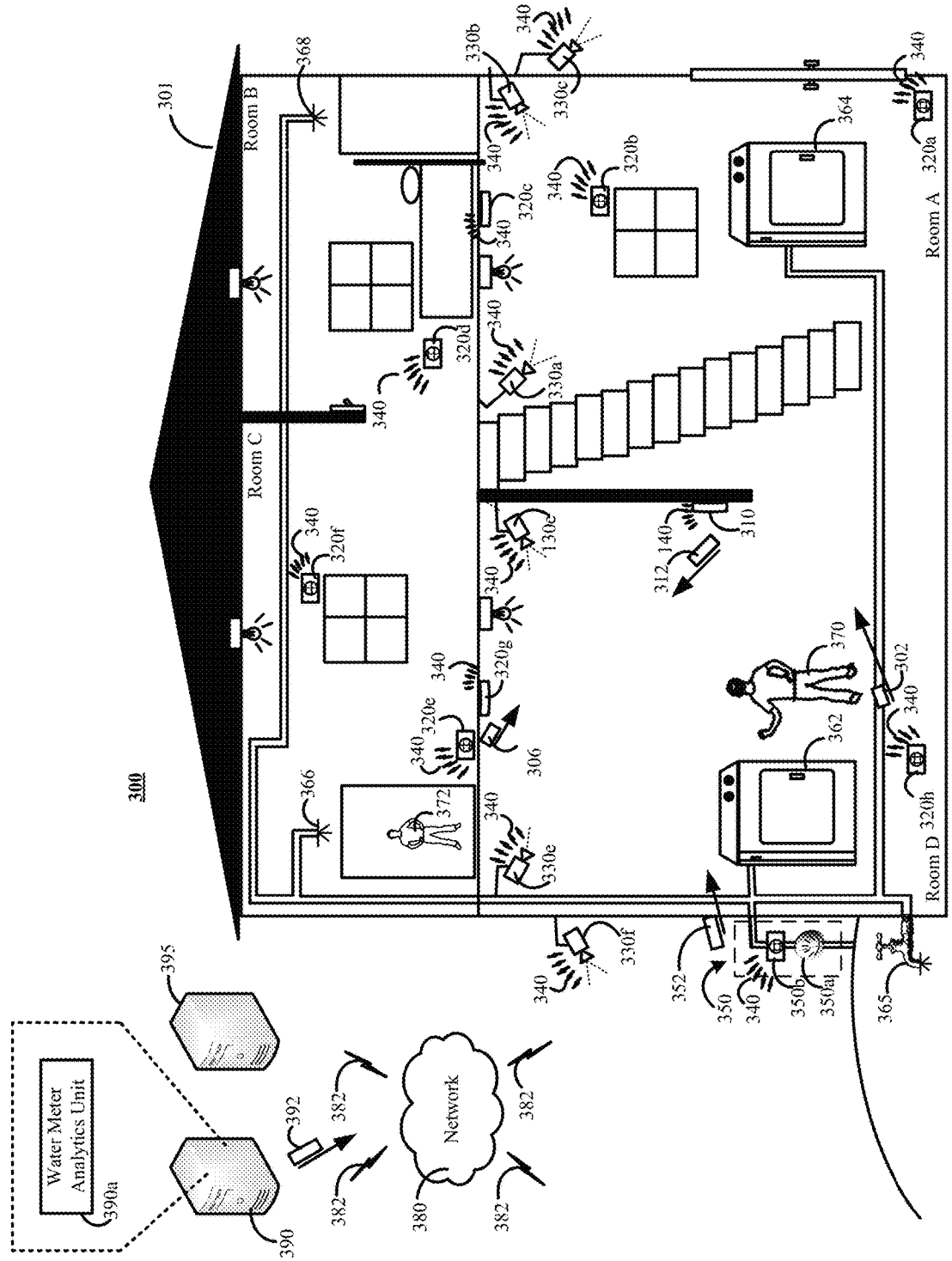
FIG. 3 is a contextual diagram of an example of a connected-home monitoring system for disaggregating water consumption data based on motion-sensor data.

FIG. 3 is a contextual diagram of an example of a connected-home monitoring system 300 for disaggregating water consumption data based on motion-sensor data 302, 306.

The connected-home monitoring system 300 is substantially similar to the connected-home monitoring systems 100, 200. However, the connected-home monitoring system may disaggregate water consumption data using data generated and broadcast by one or more motion sensors 320a, 320d, 320e, 320h.

By way of example, the connected-home monitoring system 300 may determine that a washing machine is being used based on the water consumption data such as a waveform indicating the shape of a water consumption curve, an amplitude of the underlying water flow rate, or the like without out knowing which washing machine of multiple washing machines 362, 364 is using water. In such instances, a water meter analytics unit 390a may disaggregate the water consumption data based on motion sensor data 302, 306.

For example, a user 370 may operate a water dispensing appliance such as a washing machine 362. Operation of the washing machine 362 results in the consumption of water. A monitoring system control unit 310 may detect water sensor data 352 and sensor data generated by one or more motion sensors 320a, 320d, 320e, 320h such as motion sensor data 302, 306. The monitoring system control unit 310 may detect (i) the water sensor data 352 and (ii) the motion sensor data 302, 306. The monitoring system control unit 310 may then generate a message 312 that includes the detected sensor data, and transmit the message 312 to the monitoring application server 390. The monitoring application server 390 may analyze a water meter analytics unit 390a using isolated event techniques, disaggregation of overlapping techniques, or the like to determine that a washing machine at the property 301 is (was) consuming water.

The water meter analytics unit 390a may determine that a current water consumption curve indicated by the received water sensor data is indicative of a washing machine using water. However, the property 301 may have multiple washing machines 362, 364. The water meter analytics unit 390a (or some other component of monitoring application server 390) may then use the motion sensor data to determine which washing machine of multiple washing machines 362, 364 were using water. For example, the water meter analytics unit 390a (or some other component of monitoring application server 390) may determine that movement of an object (e.g., a human) was detected near washing machine 362, based on the motion sensor data 302, by a property occupant 370 within a predetermined threshold period of time of the washing machine water consumption data being generated, obtained, or the like. Alternatively, or in addition, the water meter analytics unit 390a may determine, based on the lack of sensor data generated by the motion sensor 320a within a predetermined threshold period of time of the washing machine water consumption data being generated or obtained that there is no movement of an object (e.g., a human) in the vicinity of the washing machine 364. Based on the lack of sensor data being generated by the motion sensor 320a, the water meter analytics unit 390a can determine that the washing machine 362 is using water and the washing machine 364 is not using water.

By way of yet another example, a user such as a child 372 of an adult property occupant may operate a water dispensing appliance such as a shower 366 of the property in Room C. Operation of the shower 366 results in the consumption of water. A monitoring system control unit 310 may detect water sensor data 352 and sensor data generated by one or more motion sensors 320a, 320d, 320e, 320h such as motion sensor data 302, 306. The monitoring system control unit 310 may detect (i) the water sensor data 352 and (ii) the motion sensor data 302, 306. The monitoring system control unit 310 may then generate a message 312 that includes the detected sensor data, and transmit the message 312 to the monitoring application server 390. The monitoring application server 390 may analyze a water meter analytics unit 390a using isolated event techniques, disaggregation of overlapping techniques, or the like to determine that a shower of property 301 is (was) consuming water.

The water meter analytics unit 390a may determine that a current water consumption curve indicated by the received water sensor data is indicative of a shower using water. However, the property 301 may have multiple showers 366, 368. The water meter analytics unit 390a (or some other component of monitoring application server 390) may then use the motion sensor data 306 to determine which shower of multiple showers 366, 368 are (were) using water. For example, the water meter analytics unit 390a (or some other component of monitoring application server 390) may determine that movement was detected near kids' shower 366, based on the motion sensor data 306, by a child occupant 372 within a predetermined threshold period of time of the shower water consumption data being generated, obtained, or the like. Alternatively, or in addition, the water meter analytics unit 390 may determine, based on the lack of motion sensor data generated by the motion sensor 320d, that there was no movement in the vicinity of the shower 368 in the master bedroom "Room B" of the property 301 within a predetermined threshold period of time of the shower water consumption data being generated, obtained, or the like. Based on the water sensor data and the motion sensor data, the water meter analytics unit 390a may determine that the shower water consumption data was based on water usage from the kid's shower 366 and not the shower 368 in the master bath.

The examples described with respect to FIG. 3 describe scenarios where motion sensor data 302, 306 is used to determine which water dispensing appliance of multiple different water dispensing devices of the same type is using water. However, the present disclosure need not be so limited. Accordingly, it is also contemplated that motion sensor data 302, 306 can be used to assist in disaggregating water consumption data for multiple different devices. For example, motion sensor data 302, 306 can be used to select (or remove) one or more types of water dispensing appliance signatures for use in reverse engineering an aggregate water consumption waveform. That is, if movement is detected in the vicinity of a particular water dispensing appliance within a threshold period of time of water usage being detected, then the water dispensing appliance signature for the water dispensing appliance can be used as part of the two or more water dispensing appliance signatures used to iteratively reverse engineer an aggregate water consumption waveform representing the shape of a water consumption curve of the known water dispensing appliance, an amplitude of the underlying water flow rate of the known water dispensing appliance, or the like. Alternatively, or in addition, if movement is not detected in the vicinity of a water dispensing appliance within a threshold period of time of water usage being detected, then the water dispensing appliance signature for the water dispensing appliance can be removed from consideration from the set of two or more water dispensing appliance signatures used to iteratively reverse engineer an aggregate water consumption waveform representing the shape of a water consumption curve of the known water dispensing appliance, an amplitude of the underlying water flow rate of the known water dispensing appliance, or the like.

The example of FIG. 3 using motion sensor data to determine if a moving human object is present in the vicinity of a particular water dispensing appliance. In such instances, a water meter analytics unit 390a being executed by a monitoring unit such as a monitoring application server 390 or a monitoring system control unit 310 may infer the presence of an object (e.g., a human) near a water dispensing appliance based on motion sensor data 302, 306 within a threshold amount of time of water usage by the water dispensing appliance. The presence of an object (e.g., a human) near a particular water dispensing device can then be used to determine which water dispensing device of multiple water dispensing devices at the property is using water. However, the present disclosure is not limited to the use of motion sensors 320h, 320a, 320e, 320d to infer the presence of a human object near a water dispensing device within a threshold amount of time of the detection of water usage by a water dispensing device.

Instead, other sensors may be used to generate sensor data that can be used to infer the presence of an object (e.g., a human) near a water dispensing device within a threshold amount of time of the detection of water usage by a water dispensing device. Such other sensors may include contact sensors, energy sensors, cameras, or any combination there. For example, sensor data generated by a contact sensor may indicate that a human object opened a door to a room that has a water dispensing appliance, that a human object opened a door (e.g., washing machine door) of a water dispensing appliance, or the like. By way of another example, sensor data generated by an energy sensor can indicate that a human object powered on a water dispensing appliance. By way of another example, image analysis can be performed by a monitoring unit (e.g., a monitoring system control unit 310, monitoring application server 390, or both) to determine if sensor data generated by the camera (e.g., an image captured by the camera) depicts a human object. Each of these types of sensor data can be used by the water meter analytics unit 390a (or any other computer programs executing on any component of the connected-home monitoring system 300) to infer the presence of a human object near a water dispensing appliance.

The examples described with respect to FIG. 3 include a description of the water consumption data and motion sensor data each being detected by the monitoring system control unit 310 and then relayed to the monitoring application server 390. However, the present disclosure need not be so limited. For example, the water consumption data 352 and motion sensors data may be sent directly to the monitoring application server 390 without first passing through the monitoring system control unit 310. Alternatively, the water meter analytics unit may be installed on the monitoring system control unit 310. In such implementations, the detection and processing of water consumption data and motion sensor data may take place at the monitoring system control unit 310.

Figure 4:
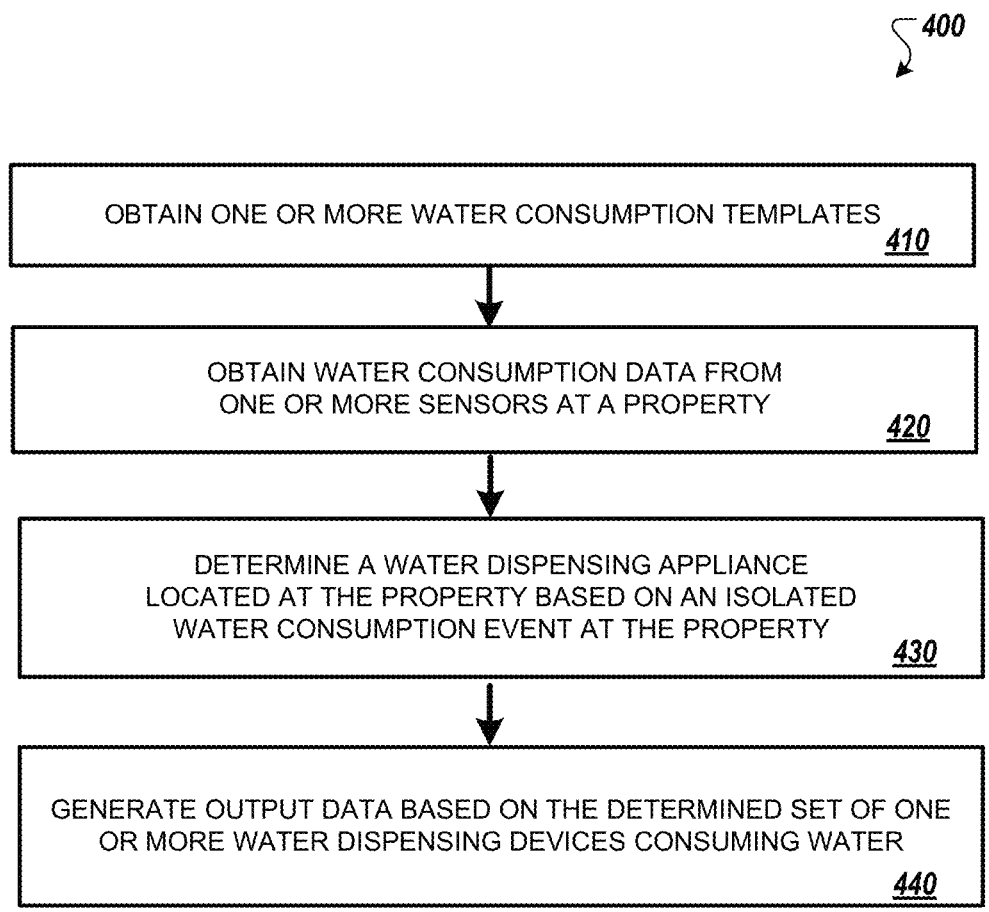
FIG. 4 is a flowchart of an example of a process for identifying a water dispensing appliance at a property based on an isolated water consumption event.

FIG. 4 is a flowchart of an example of a process 400 for identifying a water dispensing appliance at a property based on an isolated water consumption event. Generally, the process 400 includes obtaining one or more water consumption templates (410), obtaining water consumption data from one or more sensors at a property (420), determining a water dispensing appliance located at the property based on an isolated water consumption event at the property (430), and generating output data based on the determined set of one or more water dispensing appliances consuming water (440).

In more detail, a monitoring application server can obtain 410 one or more water consumption templates. Each water consumption template may correspond to water usage associated with a water dispensing appliance. The water consumption template may include a known water dispensing appliance signature. A known water dispensing appliance signature may include a profile of a particular water dispensing appliance's water usage. The known water dispensing appliance signature may be based on an amount of water usage by a particular water dispensing appliance with respect to a particular time period. The known water dispensing appliance signature may be associated with water consumption characteristics such as a waveform representing the shape of a water consumption curve of the known water dispensing appliance, an amplitude of the underlying water flow rate of the known water dispensing appliance, or the like. Each respective water dispensing appliance signature may also be associated with a predetermined amount of error to capture differences in waveform or amplitude that may exist from a first water dispensing appliance to second water dispensing appliance of the same, or similar, make, model, type, or the like. A water dispensing appliance signature is a known water dispensing appliance signature if the monitoring application server has associated a particular water dispensing appliance signature with a particular appliance.

The monitoring application server can obtain 420 water consumption data from one or more sensors at a property. The water consumption data may be indicative of water consumption for a property during a particular time period. In some implementations, the water consumption data may include unstructured information indicative of water consumption data at a property. In such instances, the monitoring application server can generate a periodic consumption report that is based upon the received water consumption data. Alternatively, the monitoring application server can receive a periodic consumption report generated by another component of a connected-home monitoring system associated with the property. The periodic consumption report may represent characteristics of a property's water consumption rate for a particular time period. The characteristics may include data that is indicative of a wave form representing the shape of a water consumption curve, an amplitude of the underlying water flow rate, or the like.

The monitoring application server can determine 430 a set of one or more water dispensing appliances located at the property based on an isolated water consumption event at the property. Determining a set of one or more water dispensing appliances located at a property based on an isolated water consumption event may include the monitoring application server generating an unknown water dispensing appliance signature for the water consumption event. The unknown water dispensing appliance signature may include a profile of the unknown water dispensing appliance's water usage. The unknown water dispensing appliance signature may be based on an amount of water usage by an unknown water dispensing appliance with respect to a particular time period. The unknown water dispensing appliance signature may be associated with water consumption characteristics such as a waveform representing the shape of a water consumption curve, an amplitude of an underlying water flow rate, or the like. The unknown water dispensing appliance signature may be compared to one or more of the obtained water consumption templates for one or more water dispensing appliances at the property from where the water consumption data was obtained.

If a match within a predetermined amount of error is identified between the unknown water dispensing appliance signature and a water consumption template for a known water dispensing appliance, the monitoring application server may determine that the unknown water dispensing appliance signature corresponds to the appliance type that is associated with the known water dispensing appliance template. In such instances, the monitoring application server may generate 440 output data based on the determination that the property includes a water dispensing appliance of a particular type. For example, the monitoring application server may store data that associates the corresponding appliance type associated with the known water dispensing template with the unknown water dispensing signature. In addition, the monitoring application server may also store data indicating that the property includes the particular appliance type.

Alternatively, if a match within a predetermined amount of error cannot be identified between an unknown water dispensing appliance signature and a known water dispensing appliance signature, then further analysis of the unknown water dispensing appliance signature may be performed. For example, review and analysis of the unknown water dispensing appliance signature may be performed by a human user in an effort to determine a water dispensing appliance type that is associated with the unknown water dispensing appliance signature.

The process of FIG. 4, can be used to identify one or more water dispensing appliances installed at a property. In addition, once each of the water dispensing appliances are installed in the property, stages 410, 420, and 430 of the process of FIG. 4 can be used to determine whether one or more particular appliances installed at the property are currently using water. For instance, the monitoring application server may obtain each water consumption template associated with a property, receive data indicative of current water consumption data from a connected water meter at the property, and then determine, based on a comparison of the stored water consumption templates for the property and a water consumption signature that is based on the current water consumption data, which water dispensing appliance of the plurality of water dispensing appliances stored at the property are currently using water. In such instances, the monitoring application server may transmit one or more notifications to one or more devices alerting the users of the devices that one or more particular water dispensing appliances are currently using water.

Figure 5:
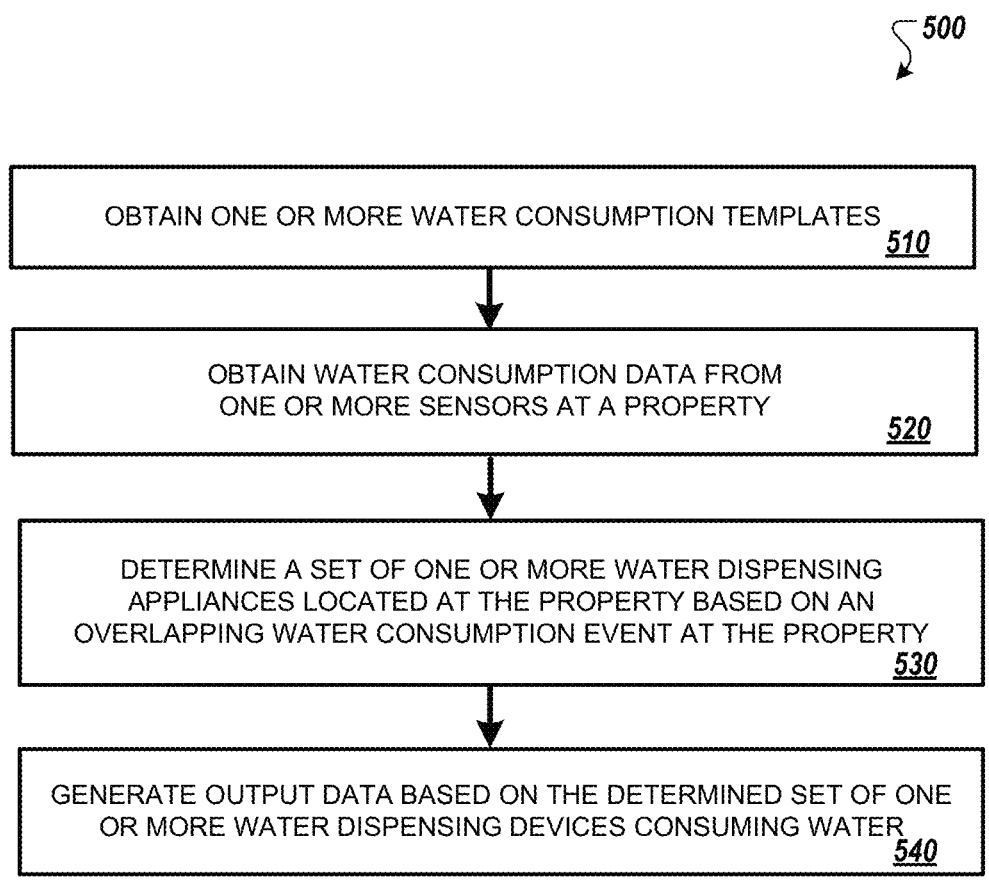
FIG. 5 is a flowchart of an example of a process for identifying one or more water dispensing appliances at a property based on an overlapping water consumption event.

FIG. 5 is a flowchart of an example of a process for identifying one or more water dispensing appliances at a property based on an overlapping water consumption event. Generally, the process 500 includes obtaining one or more water consumption templates (510), obtaining water consumption data from one or more sensors at a property (520), determining a set of one or more water dispensing appliances located at the property based on an overlapping water consumption event at the property (530), and generating output data based on the determined set of one or more water dispensing appliances consuming water (540).

In more detail, a monitoring application server can obtain 510 one or more water consumption templates. Each water consumption template may correspond to water usages associated with a water dispensing appliance. The water consumption template may include a known water dispensing appliance signature. A known water dispensing appliance signature may include a profile of a particular water dispensing appliance's water usage. The known water dispensing appliance signature may be based on an amount of water usage by a particular water dispensing appliance with respect to a particular time period. The known water dispensing appliance signature may be associated with water consumption characteristics such as a waveform representing the shape of a water consumption curve of the known water dispensing appliance, an amplitude of the underlying water flow rate of the known water dispensing appliance, or the like. Each respective water dispensing appliance signature may also be associated with a predetermined amount of error to capture differences in waveform or amplitude that may exist from a first water dispensing appliance to second water dispensing appliance of the same, or similar, make, model, type, or the like. A water dispensing appliance signature is a known water dispensing appliance signature if the monitoring application server has associated a particular water dispensing appliance signature with a particular appliance.

The monitoring application server can obtain 520 water consumption data from one or more sensors at a property. The water consumption data may be indicative of water consumption for a property during a particular time period. In some implementations, the water consumption data may include unstructured information indicative of water consumption data at a property. In such instances, the monitoring application server can generate a periodic consumption report that is based upon the received water consumption data. Alternatively, the monitoring application server can receive a periodic consumption report generated by another component of a connected-home monitoring system associated with the property. The periodic consumption report may represent characteristics of a property's water consumption rate for a particular time period. The characteristics may include data that is indicative of a waveform representing the shape of a water consumption curve, an amplitude of an underlying water flow rate, or the like. For an overlapping water consumption event, the waveform may be an aggregate waveform representing the shape of an overlapping water consumption curve, an amplitude of an underlying aggregate water flow rate, or the like.

The monitoring application server can determine 530 a set of one or more water dispensing appliances located at the property based on an overlapping water consumption event. Determining a set of one or more water dispensing appliances located at the property based on an overlapping water consumption event includes using disaggregation techniques.

The monitoring application server may disaggregate an overlapping event by performing an iterative process on the water consumption data obtained at stage 520. The iterative process may include, for example, reverse engineering the characteristics associated with the water consumption data obtained at stage 520 using two or more of the obtained water consumption templates obtained at stage 510.

Reverse engineering the waveform representing the shape of the water consumption curve, the amplitude of the underlying flow rate, or both, may include, for example, the monitoring application server iteratively determining whether any combination of water consumption templates for the property obtained at stage 510 can be aggregated in order to replicate the characteristics associated with the obtained water consumption data. For example, the monitoring application server may perform processes that compare two or more of the obtained water consumption templates to replicate a waveform representing the shape of a water consumption curve associated with the property's water consumption data, the amplitude of the underlying flow rate associated with the property's water consumption data, a combination thereof, or the like.

If there exists one or more combinations of water consumption templates for the property that results in a waveform of a water consumption curve, an amplitude of an underlying water flow rate, a combination therefore, or the like, that is substantially equal to (or within a predetermined amount of error of) the waveform representing the shape of the overlapping water consumption curve, the amplitude of the underlying overlapping flow rate, a combination thereof, or the like that is associated with the received water consumption data at stage 520, then the water consumption data may be disaggregated. For example, the received water consumption data associated with an overlapping event may be disaggregated as being the result of a particular set of water dispensing appliances that correspond to the particular combination of water consumption templates used to replicate the water consumption data obtained at stage 520.

The monitoring application server may determine that the water consumption data that was obtained at stage 520 was produced by the two or more water dispensing appliance types that correspond to the two or more water consumption templates that were used to reverse engineer the characteristics associated with the water consumption data obtained at stage 520. In such instances, the monitoring application server may generate 540 output data based on the determination that the property includes each of the two or more types of water dispensing appliances. For example, the monitoring application server may store data that associates the corresponding water dispensing appliance types with the aggregated water consummation data. In addition, the monitoring application server may also store data indicating that the property includes the particular appliance types.

Alternatively, if each water consumption template for the property results in a waveform representing the shape of a water consumption curve, the amplitude of an underlying flow rate, a combination thereof, or the like that is greater than the shape of a water consumption curve, the amplitude of an underlying flow rate, a combination thereof, or the like that is associated with the water consumption data received at stage 520, then the received water consumption data may be associated with an isolated event. In such instances, the water dispensing appliance that is associated with the isolated event may be identified using the process 400 described with reference to FIG. 4.

In some implementations, the monitoring application server may intelligently select a combination of two or more known water dispensing appliance signatures to reverse engineer a waveform representing the shape of a water consumption curve, an amplitude of an underlying flow rate, a combination thereof, or the like describing the property's water consumption for a particular time period. In some implementations, intelligently selecting two or more water dispensing appliance signatures to reverse engineer the waveform representing the shape of a water consumption curve, the amplitude of the underlying flow rate, a combination thereof, or the like may include identifying a subset of water dispensing templates that can be used to reverse engineer the waveform. Identifying a subset of water dispensing appliance templates may include removing one or more water dispensing appliance templates from consideration during the iterative process. For example, the monitoring application server may remove from consideration each water dispensing appliance templates that are associated with a waveform representing the shape of a water consumption curve, an amplitude of an underlying flow rate, a combination thereof, or the like that is greater than the waveform representing the shape of a water consumption curve, the amplitude of the underlying flow rate, a combination thereof, or the like associated with the water consumption data associated with the overlapping event.

Alternatively, or in addition, the monitoring application server may eliminate one or more water dispensing appliance signatures from consideration during the iterative process based on the current state of a connected home monitoring system. For example, the connected-home monitoring system is in an armed-away state. In such instances, an armed away state may include, for example, an arming of the connected-home monitoring system to a monitoring configuration where each occupant of the property is away from the property. In such instances, the connected-home monitoring system can determine that there are no occupants at the property using a water dispensing appliance. Accordingly, known water dispensing appliance signatures for water dispensing appliances that typically only use water when a property occupant is home (e.g., a shower) can be removed from the subset of known water dispensing appliance signatures that will be used to reverse engineer an overlapping water consumption event that is identified by a connected water meter, the monitoring application server, or both based on the monitoring system's armed away state.

The monitoring application server may take advantage of other sensors used by a connected home monitoring system to eliminate one or more water dispensing appliance signatures from consideration during the iterative process. In some implementations, for example, the monitoring application server may use energy metering data from one or more energy sensors as a means to intelligently eliminate water dispensing appliance signatures from consideration during the iterative process. For example, the monitoring application server may monitor the output of one or more energy sensors installed at the property and determine, based on the energy metering data detected by the one or more energy sensors, that the energy being used by a dishwasher at the property fails to satisfy a predetermined threshold (e.g., only a minimal amount of energy is being used by the dishwasher to power LEDs on the control panel, less energy is being used to by the dishwasher than is required to run the dishwasher's motor, or the like). In a similar manner, the monitoring application server may determine, based on the energy metering data, that energy being used by a washing machine satisfies a predetermined threshold (e.g., a sufficient enough energy to power LEDs on the washing machine control panel and run the washing machine motor). In such instances, the monitoring application server may remove the water dispensing appliance signature for the dishwasher from use in the iterative process of disaggregating water consumption data because the low energy use by the dishwasher indicates that the dish washer is not running and consuming water. On the other hand, the monitoring application server may continue to use the water dispensing appliance signature for the washing machine during the iterative process of disaggregating water consumption data because energy metering data indicates that the washing machine is likely running its motor, and therefore likely consuming water.

The process of FIG. 5, can be used to identifying one or more water dispensing appliances installed at a property. In addition, once each of the water dispensing appliances are installed in the property, stages 510, 520, and 530 of the process of FIG. 5 can be used to determine whether one or more particular appliances installed at the property are currently using water. For instance, the monitoring application server may obtain each water consumption template associated with a property, receive data indicative of current water consumption data from a connected water meter at the property, and then determine, by disaggregating the current water consumption data, which water dispensing appliances of the plurality of water dispensing appliances located at the property are currently using water. In such instances, the monitoring application server may transmit one or more notifications to one or more devices alerting the users of the devices that one or more particular water dispensing appliances are currently using water.

Figure 6:
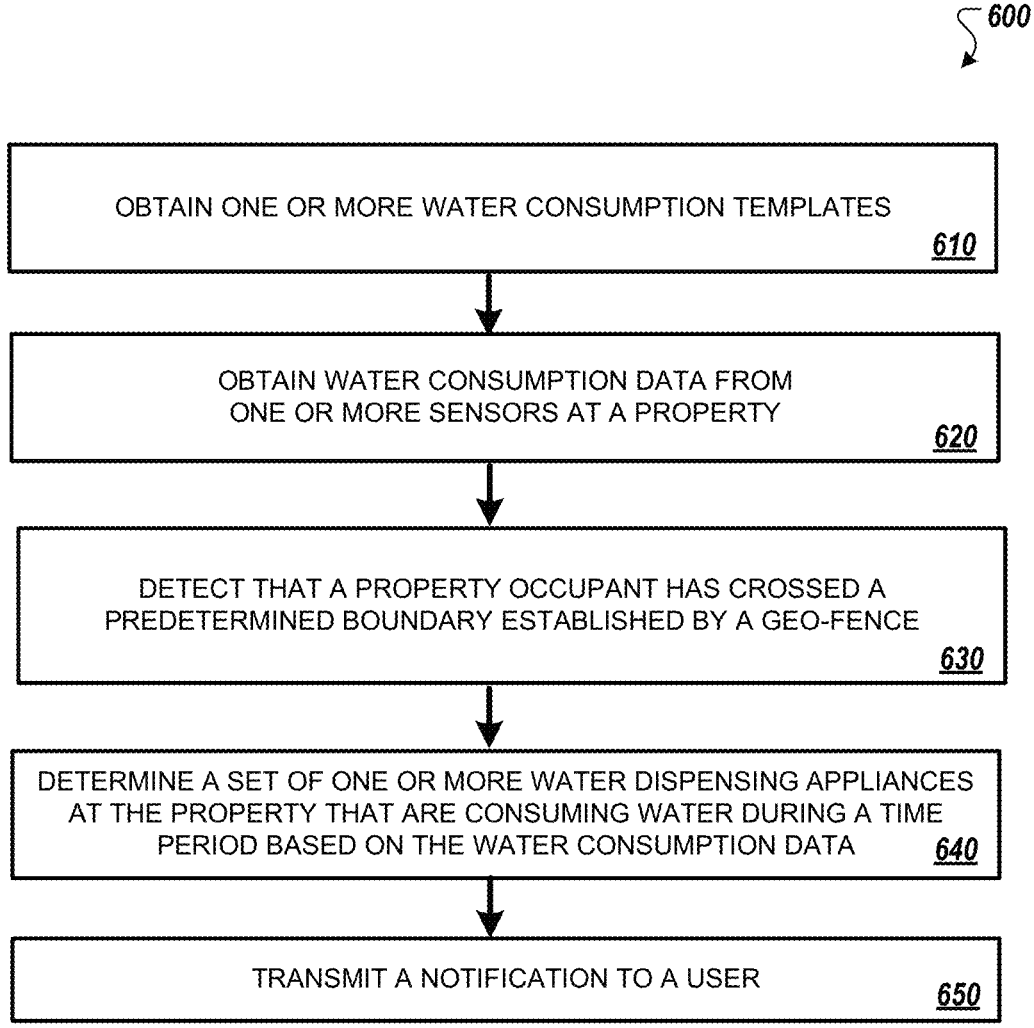
FIG. 6 is a flowchart of an example of a process for disaggregating water consumption data.

FIG. 6 is a flowchart of an example of a process for disaggregating water consumption data. Generally, the process 600 includes obtaining one or more water consumption templates (610), obtaining water consumption data from one or more sensors at a property (620), detecting that a property occupant has crossed a predetermined boundary established by a geo-fence (630), determining a set of one or more water dispensing appliances at the property that are consuming water during a time period based on the water consumption data (640), and transmitting a notification to a user (650).

In more detail, a monitoring application server can obtain 610 one or more water consumption templates. Each water consumption template may correspond to water usages associated with a water dispensing appliance. The water consumption template may include a known water dispensing appliance signature. A known water dispensing appliance signature may include a profile of a particular water dispensing appliance's water usage. The known water dispensing appliance signature may be based on an amount of water usage by a particular water dispensing appliance with respect to a particular time period. The known water dispensing appliance signature may be associated with water consumption characteristics such as a waveform representing the shape of a water consumption curve of the known water consumption appliance, an amplitude of an underlying water flow rate of the known water consumption appliance, or the like. Each respective water dispensing appliance signature may also be associated with a predetermined amount of error to capture differences in waveform or amplitude that may exist from a first water dispensing appliance to second water dispensing appliance of the same, or similar, make, model, type, or the like. A water dispensing appliance signature is a known water dispensing appliance signature if the monitoring application server has associated a particular water dispensing appliance signature with a particular appliance.

The monitoring application server can obtain 620 water consumption data from one or more sensors at a property. The water consumption data may be indicative of water consumption for a property during a particular time period. In some implementations, the water consumption data may include unstructured information indicative of water consumption data at a property. In such instances, the monitoring application server can generate a periodic consumption report that is based upon the received water consumption data. Alternatively, the monitoring application server can receive a periodic consumption report generated by another component of a connected-home monitoring system associated with the property. The periodic consumption report may represent characteristics of a property's water consumption rate for a particular time period. The characteristics may include data that is indicative of a waveform representing the shape of a water consumption curve, an amplitude of an underlying water flow rate, or the like.

The monitoring application server can detect 630 that a property occupant has crossed a predetermined boundary established by a geo-fence. For example, one or more sensors may be installed at the property to detect when a person crosses the predetermined boundary established by the geo-fence. The sensors may include GPS sensors, RFID sensors, motion sensors, IR sensors, or the like. The one or more sensors may generate sensor data when a person crosses the predetermined boundary associated by the established geo-fence. The sensors data may be detected by a monitoring system control unit installed at the property. The monitoring system control unit may use the data generated in response to the person crossing the geo-fence and one or more other sensors within the connected-home monitoring system such as motion sensors to determine whether the person is the last property occupant, last adult property occupant, or the like to leave the property. The monitoring system control unit may generate and transmit a message to the monitoring application server that includes data informing the monitoring application server that a person has crossed the boundary established by the geo-fence.

The monitoring application server can determine 640 a set of one or more water dispensing appliances at the property that are consuming water during a time period based on the water consumption data. For example, the monitoring application server may analyze the water consumption data received from a connected water meter installed at the property using the techniques described with reference to FIGS. 1, 4, and 5 above to determine if any isolated events exist, disaggregate any overlapping consumption events that exist, or the like to determine whether one or more water dispensing appliances installed at the property are using water. In response to determining that one or more water dispensing appliances installed at the property are using water, the monitoring application server may determine whether the property occupant should be notified regarding the water use by each of the one or more water dispensing appliances that are using water when the property occupant crosses the geo-fence. The monitoring application server may determine whether a property occupant should be notified of the one or more water dispensing appliances using water based on the type of the water dispensing appliances using water.

The type of water dispensing appliance may be determined by accessing stored water dispensing appliance metadata that categorizes water dispensing appliances based on usage type. For example, some water dispensing appliances may be permitted to use water regardless of the property occupant's location. That is, the water dispensing appliances can use water when the property occupant is at the property or when the property occupant is away from the property. Alternatively, other water dispensing appliances may only be permitted to use water when a property occupant is located at the property. After a water dispensing appliance using water is identified using the techniques described with reference to FIGS. 1, 4, and 5, the monitoring application server may access the stored water dispensing appliance metadata indicating whether the water dispensing appliance is of the type that can use water when the property occupant (e.g., all property occupants, all adult property occupants, or the like) is away from the property.

If the one or more water dispensing appliances using water are of the type that cannot be used when a property occupant is away from the property, then the monitoring application server may transmit a notification 650 to a property occupant (e.g., the property occupant that crossed the boundary established by the geo-fence). In some implementations, the notification may identify the one or more water dispensing appliances at the property that (i) are consuming water, and (ii) were previously identified as water dispensing appliances that should not use water when the property occupant (e.g., all property occupants, all adult property occupants, or the like) is away from the property. The property occupant may review message, and re-enter the property to turn off the one or more water dispensing appliances associated with the notification.

Figure 7:
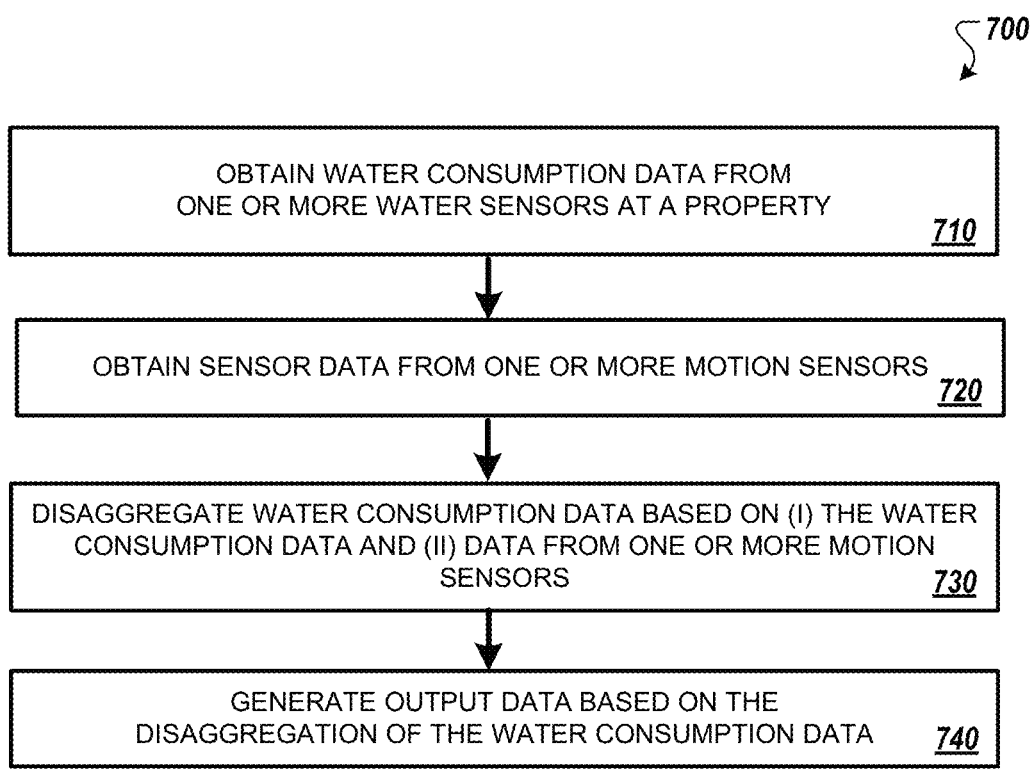
FIG. 7 is a flowchart of an example of a process for disaggregating water consumption data using motion-sensor data.

FIG. 7 is a flowchart of an example of a process 700 for disaggregating water consumption data using motion-sensor data. Generally, the process 700 includes obtaining water consumption data from one or more water sensors at a property (710), obtaining sensor data from one or more motion sensors (720), disaggregating the water consumption data based on (i) the water consumption data and (ii) data from one or more motion sensors (730), and generating output data based on the disaggregation of the water consumption data (740).

In more detail, the monitoring application server can obtain 710 water consumption data from one or more water sensors at a property. The water consumption data may be indicative of water consumption for a property during a particular time period. In some implementations, the water consumption data may include unstructured information indicative of water consumption data at a property. In such instances, the monitoring application server can generate a periodic consumption report that is based upon the received water consumption data. Alternatively, the monitoring application server can receive a periodic consumption report generated by another component of a connected-home monitoring system associated with the property. The periodic consumption report may represent characteristics of a property's water consumption rate for a particular time period. The characteristics may include data that is indicative of a waveform representing the shape of a water consumption curve, an amplitude of an underlying water flow rate, or the like.

The monitoring application server may obtain 720 sensor data from one or more motion sensors. Sensor data from one or more motion sensors may indicate whether or not there is movement within a vicinity of the motion sensor that generated the sensor data. In some implementations, each motion sensor of the one or more motion sensors may be associated with particular water dispensing appliance, a room that houses a particular water dispensing appliance, or the like. Alternatively, the sensor data may also include a sensor identifier. Then, upon receipt of the sensor data, the monitoring application server may look up the water dispensing appliance that is associated with the motion sensors based on the sensor identifier.

The monitoring application server may disaggregate 730 the water consumption data based on (i) the water consumption data and (ii) the data from one or more motion sensors. For example, the monitoring application server may identify a particular water dispensing appliance from multiple candidate water dispensing appliances as being the consumer of water characterized by the water consumption data based on the sensors data from the one or more motion sensors. For example, the monitoring application server can determine that a master bathroom shower is (was) using water of multiple different showers in the same house based on the data from one or more motion sensors. In such instances, the monitoring application server can determine that the master bathroom shower of multiple different showers in the property was the shower using water because motion sensors generated sensor data indicative of movement in the master bathroom. Alternatively, or in addition, the monitoring application server may also determine that sensor data generated by one or more motion sensors in the other remaining bathrooms of the property was supportive of a determination that no movement occurred in the other bathrooms of the property.

In some implementations, the motion data may be associated with a time stamp. In such instances, the monitoring application server can determine whether the movement detected by a motion sensor that is associated water usage by a water dispensing appliance if the time period associated with the water consumption data is sufficiently related to the timestamp of the sensor data generated by a motion sensor in the same vicinity of the water dispensing appliance.

The monitoring application server can generate 740 output data based on the disaggregation of the water consumption data. For example, the monitoring application server may store data indicating the particular water dispensing appliance at the property that was identified as using water. Alternatively, or in addition, the monitoring application server can update water usage statistics history associated with the property based on the disaggregated water consumption data. Alternatively, or in addition, the monitoring application server may generate and transmit a notification to a user device regarding the water usage. In some implementations, the notification may be generated and transmitted to a user device in response to a property occupant crossing a geo-fence.

Figure 8:
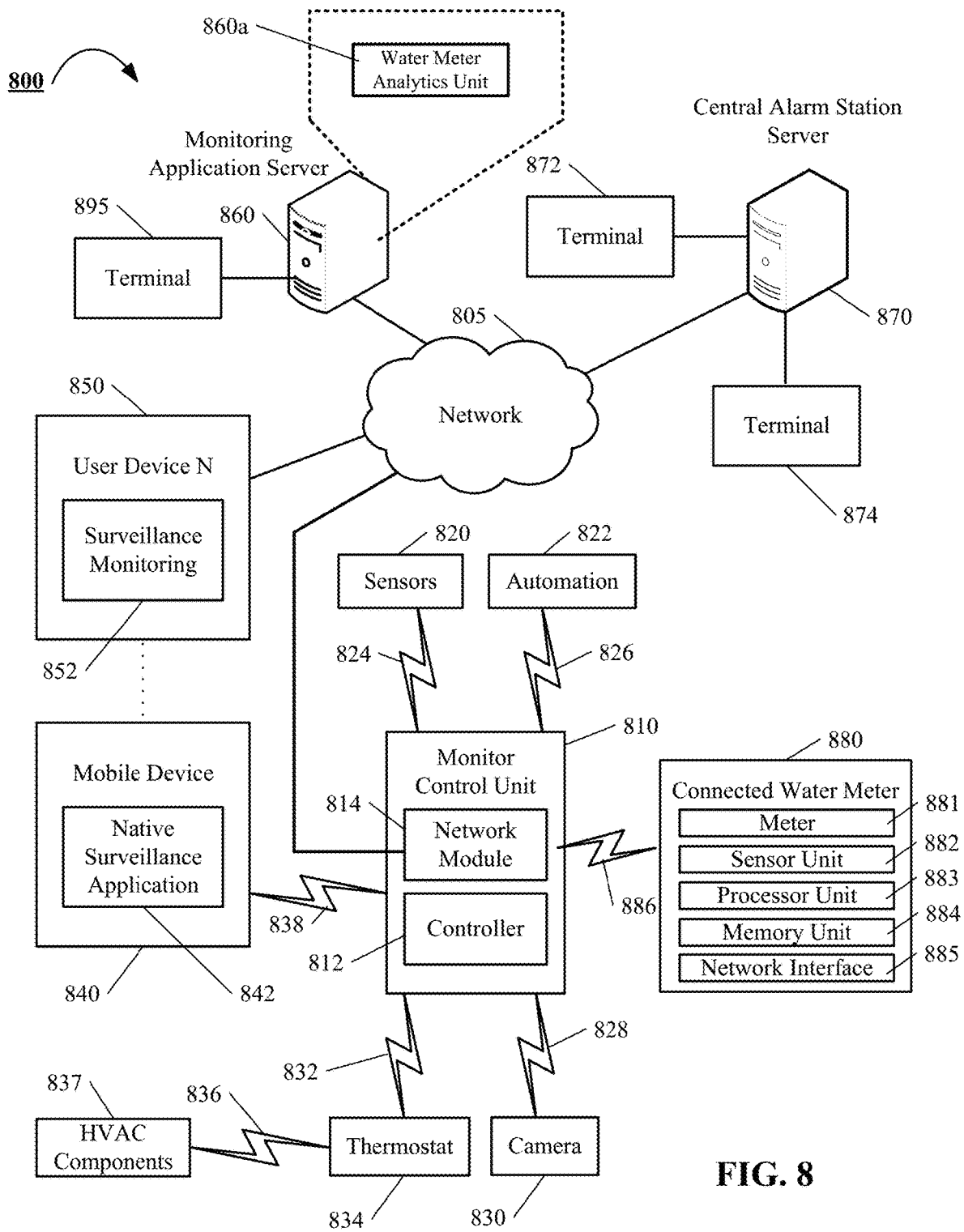
FIG. 8 is a block diagram of an example of components that can be used in a system for disaggregating water consumption data.

FIG. 8 is a block diagram of an example of components that can be used in a connected-home monitoring system 800 for disaggregating water consumption data.

The electronic system 800 includes a network 805, a monitoring system control unit 810, one or more user devices 840, 850, a monitoring application server 860, and a central alarm station server 870. In some examples, the network 805 facilitates communications between the monitoring system control unit 810, the one or more user devices 840, 850, the monitoring application server 860, and the central alarm station server 870.

The network 805 is configured to enable exchange of electronic communications between devices connected to the network 805. For example, the network 805 may be configured to enable exchange of electronic communications between the monitoring system control unit 810, the one or more user devices 840, 850, the monitoring application server 860, and the central alarm station server 870. The network 805 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 805 may include multiple networks or subnetworks, each of which may include, for example, a wired or wireless data pathway. The network 805 may include a circuit-switched network, a packet-switched data network, or any other network able to carry electronic communications (e.g., data or voice communications). For example, the network 805 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 805 may include one or more networks that include wireless data channels and wireless voice channels. The network 805 may be a wireless network, a broadband network, or a combination of networks including a wireless network and a broadband network.

The monitoring system control unit 810 includes a controller 812 and a network module 814. The controller 812 is configured to control a monitoring system (e.g., a home alarm or security system) that includes the monitoring system control unit 810. In some examples, the controller 812 may include a processor or other control circuitry configured to execute instructions of a program that controls operation of an alarm system. In these examples, the controller 812 may be configured to receive input from sensors, detectors, or other devices included in the alarm system and control operations of devices included in the alarm system or other household devices (e.g., a thermostat, an appliance, lights, etc.). For example, the controller 812 may be configured to control operation of the network module 814 included in the monitoring system control unit 810.

The network module 814 is a communication device configured to exchange communications over the network 805. The network module 814 may be a wireless communication module configured to exchange wireless communications over the network 805. For example, the network module 814 may be a wireless communication device configured to exchange communications over a wireless data channel and a wireless voice channel. In this example, the network module 814 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 814 also may be a wired communication module configured to exchange communications over the network 805 using a wired connection. For instance, the network module 814 may be a modem, a network interface card, or another type of network interface device. The network module 814 may be an Ethernet network card configured to enable the monitoring system control unit 810 to communicate over a local area network and/or the Internet. The network module 814 also may be a voiceband modem configured to enable the alarm panel to communicate over the telephone lines of Plain Old Telephone Systems (POTS).

The monitoring system that includes the monitoring system control unit 810 includes one or more sensors or detectors. For example, the monitoring system may include multiple sensors 820. The sensors 820 may include a contact sensor, a motion sensor, a glass break sensor, or any other type of sensor included in an alarm system or security system. The sensors 820 also may include an environmental sensor, such as a temperature sensor, a water sensor, a rain sensor, a wind sensor, a light sensor, a smoke detector, a carbon monoxide detector, an air quality sensor, etc. The sensors 820 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 820 may include a radio-frequency identification (RFID) sensor that identifies a particular article that includes a pre-assigned RFID tag.

The monitoring system control unit 810 communicates with the module 822 and the camera 830 to perform surveillance or monitoring. The module 822 is connected to one or more devices that enable home automation control. For instance, the module 822 may be connected to one or more lighting systems and may be configured to control operation of the one or more lighting systems. Also, the module 822 may be connected to one or more electronic locks at the property and may be configured to control operation of the one or more electronic locks (e.g., control Z-Wave locks using wireless communications in the Z-Wave protocol. Further, the module 822 may be connected to one or more appliances at the property and may be configured to control operation of the one or more appliances. The module 822 may include multiple modules that are each specific to the type of device being controlled in an automated manner. The module 822 may control the one or more devices based on commands received from the monitoring system control unit 210. For instance, the module 222 may cause a lighting system to illuminate an area to provide a better image of the area when captured by a camera 230.

The camera 830 may be a video/photographic camera or other type of optical sensing device configured to capture images. For instance, the camera 830 may be configured to capture images of an area within a building monitored by the monitoring system control unit 810. The camera 830 may be configured to capture single, static images of the area and also video images of the area in which multiple images of the area are captured at a relatively high frequency (e.g., thirty images per second). The camera 830 may be controlled based on commands received from the monitoring system control unit 810.

The camera 830 may be triggered by several different types of techniques. For instance, a Passive Infra Red (PIR) motion sensor may be built into the camera 830 and used to trigger the camera 830 to capture one or more images when motion is detected. The camera 830 also may include a microwave motion sensor built into the camera and used to trigger the camera 830 to capture one or more images when motion is detected. The camera 830 may have a "normally open" or "normally closed" digital input that can trigger capture of one or more images when external sensors (e.g., the sensors 820, PIR, door/window, etc.) detect motion or other events. In some implementations, the camera 830 receives a command to capture an image when external devices detect motion or another potential alarm event. The camera 830 may receive the command from the controller 812 or directly from one of the sensors 820.

In some examples, the camera 830 triggers integrated or external illuminators (e.g., Infra Red, Z-wave controlled "white" lights, lights controlled by the module 822, etc.) to improve image quality when the scene is dark. An integrated or separate light sensor may be used to determine if illumination is desired and may result in increased image quality.

The camera 830 may be programmed with any combination of time/day schedules, system "arming state", or other variables to determine whether images should be captured or not when triggers occur. The camera 830 may enter a low-power mode when not capturing images. In this case, the camera 830 may wake periodically to check for inbound messages from the controller 812. The camera 830 may be powered by internal, replaceable batteries if located remotely from the monitoring system control unit 810. The camera 830 may employ a small solar cell to recharge the battery when light is available. Alternatively, the camera 830 may be powered by the controller's 812 power supply if the camera 830 is co-located with the controller 812.

In some implementations, the camera 830 communicates directly with the monitoring application server 860 over the Internet. In these implementations, image data captured by the camera 830 does not pass through the monitoring system control unit 810 and the camera 830 receives commands related to operation from the monitoring application server 860.

The system 800 also includes thermostat 834 to perform dynamic environmental control at the property. The thermostat 834 is configured to monitor temperature and/or energy consumption of an HVAC system associated with the thermostat 834, and is further configured to provide control of environmental (e.g., temperature) settings. In some implementations, the thermostat 834 can additionally or alternatively receive data relating to activity at a property and/or environmental data at a property, e.g., at various locations indoors and outdoors at the property. The thermostat 834 can directly measure energy consumption of the HVAC system associated with the thermostat, or can estimate energy consumption of the HVAC system associated with the thermostat 834, for example, based on detected usage of one or more components of the HVAC system associated with the thermostat 834. The thermostat 834 can communicate temperature and/or energy monitoring information to or from the monitoring system control unit 810 and can control the environmental (e.g., temperature) settings based on commands received from the monitoring system control unit 810.

In some implementations, the thermostat 834 is a dynamically programmable thermostat and can be integrated with the monitoring system control unit 810. For example, the dynamically programmable thermostat 834 can include the monitoring system control unit 810, e.g., as an internal component to the dynamically programmable thermostat 834. In addition, the monitoring system control unit 810 can be a gateway device that communicates with the dynamically programmable thermostat 834.

A module 837 is connected to one or more components of an HVAC system associated with a property, and is configured to control operation of the one or more components of the HVAC system. In some implementations, the module 837 is also configured to monitor energy consumption of the HVAC system components, for example, by directly measuring the energy consumption of the HVAC system components or by estimating the energy usage of the one or more HVAC system components based on detecting usage of components of the HVAC system. The module 837 can communicate energy monitoring information and the state of the HVAC system components to the thermostat 834 and can control the one or more components of the HVAC system based on commands received from the thermostat 834.

The system 800 further includes a connected water meter 880. The connected water meter may include water meter 881, a sensor unit 882, a processor unit 883, a memory unit 884, and a network interface 885. The water meter 881 may measure water usage of a property where the connected water meter 880 is installed. The water meter 881 may measure water in terms of a unit of volume such as liters, gallons, or the like. The measurements of the water meter 881 may be used by a utility company to determine a monthly water consumption total. The sensor unit 882 may include one or more sensors configured to detect water flow and generate sensor data. The sensor data generated by the sensors unit 882 may be used to generate a waveform indicating the shape of a water consumption curve, an amplitude of the underlying water flow rate, or the like.

The sensor data may be stored in the memory unit 884, and may be periodically transmitted to a monitoring application server 890 using the network interface 885, one or more communication links 886, the network 805, the network module 814, a combination thereof, or the like. In some implementations, the connected water meter 880 may use a processing unit 883 to process the sensor data stored in the memory unit 884 to generate periodic consumption reports that may be transmitted to the monitoring application server 860. Alternatively, the connected water meter 880 may use the network interface 885, one or more communication links 886, the network module 814, the network 805, a combination thereof, or the like to transmit the sensor data to the monitoring application server 860. In such instances, the monitoring application server may then generate a periodic consumption report that can be analyzed by the water meter analytics unit 860*a*. Alternatively, the monitoring application server 860 can forward the sensor data generated by the sensor unit 882 to the water meter analytics unit 860*a* for analysis without generating a periodic consumption report.

The processing unit 883 may include one or more processors. The processing unit 883 may access, and process, instructions stored in the memory unit 884 to realize the functionality of the connected water meter 880 described by this specification.

The sensors 820, the module 822, the camera 830, the thermostat 834, and the connected water meter 880 communicate with the controller 812 over communication links 824, 826, 828, 832, 884, and 886. The communication links 824, 826, 828, 832, 884, and 886 may be a wired or wireless data pathway configured to transmit signals from the sensors 820, the module 822, the camera 830, the thermostat 834, and the connected water meter 880 to the controller 812. The sensors 820, the module 822, the camera 830, the thermostat 834, and the connected water meter 880 may continuously transmit sensed values to the controller 812, periodically transmit sensed values to the controller 812, or transmit sensed values to the controller 812 in response to a change in a sensed value.

The communication links 824, 826, 828, 832, 884, and 886 may include a local network. The sensors 820, the module 822, the camera 830, the thermostat 834, and the connected water meter 880 and the controller 812 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 8 (CAT5) or Category 8 (CAT6) wired Ethernet network. The local network may be a mesh network constructed based on the devices connected to the mesh network.

The monitoring application server 860 is an electronic device configured to provide monitoring services by exchanging electronic communications with the monitoring system control unit 810, the one or more user devices 840, 850, and the central alarm station server 870 over the network 805. For example, the monitoring application server 860 may be configured to monitor events (e.g., alarm events) generated by the monitoring system control unit 810. In this example, the monitoring application server 860 may exchange electronic communications with the network module 814 included in the monitoring system control unit 810 to receive information regarding events (e.g., alarm events)

detected by the monitoring system control unit 810. The monitoring application server 860 also may receive information regarding events (e.g., alarm events) from the one or more user devices 840, 850.

In some examples, the monitoring application server 860 may route alarm data received from the network module 814 or the one or more user devices 840, 850 to the central alarm station server 870. For example, the monitoring application server 860 may transmit the alarm data to the central alarm station server 870 over the network 805.

The monitoring application server 860 may store sensor and image data received from the monitoring system and perform analysis of sensor and image data received from the monitoring system. Based on the analysis, the monitoring application server 860 may communicate with and control aspects of the monitoring system control unit 810, the connected water meter 880, the one or more user devices 840, 850, or a combination thereof.

The monitoring application server 860 may include a water meter analytics unit 860*a*. The water meter analytics unit 860*a* may analyze water consumption data such sensor data generated by the sensor unit 882, periodic consumption reports, or the like in order to identify the one or more types of water dispensing appliances that dispensed water during the time period associated with the sensor data generated by the sensor unit 882, the time period associated with a period consumption report, or the like. The analysis performed by the water meter analytics unit 860*a* may include an isolated events analysis, an overlapping events analysis, or the like.

For example, the water meter analytics unit 860*a* is configured to determine a set of one or more water dispensing appliances located at the property based on an isolated water consumption event at the property. To facilitate this determination, the water meter analytics unit 860*a* can generate an unknown water dispensing appliance signature for a water consumption event described by the sensor data generated by the sensor unit 882. The water meter analytics unit 860*a* is configured to compare the generated unknown water dispensing appliance signature to one or more of the obtained water consumption templates for one or more water dispensing appliances installed at the property. Obtained water consumption templates may be predefined templates that describe water consumption characteristics of a particular water dispensing application installed at a property. To facilitate this comparison, the water meter analytics unit 860*a* is configured to compare water consumption characteristics such as a waveform indicating the shape of a water consumption curve, an amplitude of the underlying water flow rate, or the like associated with the unknown water dispensing appliance signature to the water consumption characteristics such as a waveform indicating the shape of a water consumption curve, an amplitude of the underlying water flow rate, or the like associated with an obtained water consumption template.

The water meter analytics unit 860 is configured determine a set of one or more water dispensing appliances located at the property the property based on an overlapping water consumption event. To facilitate this determination, the water meter analytics unit 860*a* is configured to perform water consumption disaggregation techniques as described by this specification.

The water meter analytics unit 860*a* may disaggregate an overlapping event by, for example, performing an iterative process on the water consumption data received by the monitoring application server 860. For example, the water meter analytics unit 860*a* is configured to reverse engineer the water consumption characteristics associated sensor data generated by the sensor unit 882, water consumption characteristics associated with a periodic consumption report, or the like using two or more of predefined obtained water consumption templates. For example, the water meter analytics unit 860*a* is configured to receive a waveform representing the shape of the water consumption curve, the amplitude of the underlying flow rate, or both, and then iteratively determine whether any combination of predefined water consumption templates stored for the property can be aggregated in order to replicate the characteristics associated with the obtained water consumption data. For example, the water meter analytics unit 860*a* may perform processes that compare two or more of the obtained water consumption templates to replicate a waveform representing the shape of a water consumption curve associated with the property's water consumption data, the amplitude of the underlying flow rate associated with the property's water consumption data, a combination thereof, or the like.

The central alarm station server 870 is an electronic device configured to provide alarm monitoring service by exchanging communications with the monitoring system control unit 810, the connected water meter 880, the one or more mobile devices 840, 850, and the monitoring application server 860 over the network 805. For example, the central alarm station server 870 may be configured to monitor alarm events generated by the monitoring system control unit 810. In this example, the central alarm station server 870 may exchange communications with the network module 814 included in the monitoring system control unit 810 to receive information regarding alarm events detected by the monitoring system control unit 810. The central alarm station server 870 also may receive information regarding alarm events from the one or more mobile devices 840, 850, the connected water meter 880, and/or the monitoring application server 860.

The central alarm station server 870 is connected to multiple terminals 872 and 874. The terminals 872 and 874 may be used by operators to process alarm events. For example, the central alarm station server 870 may route alarm data to the terminals 872 and 874 to enable an operator to process the alarm data. The terminals 872 and 874 may include general-purpose computers (e.g., desktop personal computers, workstations, or laptop computers) that are configured to receive alarm data from a server in the central alarm station server 870 and render a display of information based on the alarm data. For instance, the controller 812 may control the network module 814 to transmit, to the central alarm station server 870, alarm data indicating that a sensor 820 detected a door opening when the monitoring system was armed. The central alarm station server 870 may receive the alarm data and route the alarm data to the terminal 872 for processing by an operator associated with the terminal 872. The terminal 872 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 872 and 874 may be mobile devices or devices designed for a specific function. Although FIG. 8 illustrates two terminals for brevity, actual implementations may include more (and, perhaps, many more) terminals.

The one or more user devices 840, 850 are devices that host and display user interfaces. For instance, the user device 840 is a mobile device that hosts one or more native applications (e.g., the native surveillance application 842).

The user device 840 may be a cellular phone or a non-cellular locally networked device with a display. The user device 840 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 840 may perform functions unrelated to the monitoring system, such as placing personal telephone calls, playing music, playing video, displaying pictures, browsing the Internet, maintaining an electronic calendar, etc.

The user device 840 includes a native surveillance application 842. The native surveillance application 842 refers to a software/firmware program running on the corresponding mobile device that enables the user interface and features described throughout. The user device 840 may load or install the native surveillance application 842 based on data received over a network or data received from local media. The native surveillance application 842 runs on mobile devices platforms, such as iPhone, iPod touch, Blackberry, Google Android, Windows Mobile, etc. The native surveillance application 842 enables the user device 840 to receive and process image and sensor data from the monitoring system.

The user device 850 may be a general-purpose computer (e.g., a desktop personal computer, a workstation, or a laptop computer) that is configured to communicate with the monitoring application server 860 and/or the monitoring system control unit 810 over the network 805. The user device 850 may be configured to display a surveillance monitoring user interface 852 that is generated by the user device 850 or generated by the monitoring application server 860. For example, the user device 850 may be configured to display a user interface (e.g., a web page) provided by the monitoring application server 860 that enables a user to perceive images captured by the camera 830 and/or reports related to the monitoring system. Although FIG. 8 illustrates two user devices for brevity, actual implementations may include more (and, perhaps, many more) or fewer user devices.

In some implementations, the one or more user devices 840, 850 communicate with and receive monitoring system data from the monitoring system control unit 810 using the communication link 838. For instance, the one or more user devices 840, 850 may communicate with the monitoring system control unit 810 using various local wireless protocols such as wifi, Bluetooth, zwave, zigbee, HomePlug (ethernet over powerline), or wired protocols such as Ethernet and USB, to connect the one or more user devices 840, 850 to local security and automation equipment. The one or more user devices 840, 850 may connect locally to the monitoring system and its sensors and other devices. The local connection may improve the speed of status and control communications because communicating through the network 805 with a remote server (e.g., the monitoring application server 860) may be significantly slower.

Although the one or more user devices 840, 850 are shown as communicating with the monitoring system control unit 810, the one or more user devices 840, 850 may communicate directly with the sensors and other devices controlled by the monitoring system control unit 810. In some implementations, the one or more user devices 840, 850 replace the monitoring system control unit 810 and perform the functions of the monitoring system control unit 810 for local monitoring and long range/offsite communication.

In other implementations, the one or more user devices 840, 850 receive monitoring system data captured by the monitoring system control unit 810 through the network 805. The one or more user devices 840, 850 may receive the data from the monitoring system control unit 810 through the network 805 or the monitoring application server 860 may relay data received from the monitoring system control unit 810 to the one or more user devices 840, 850 through the network 805. In this regard, the monitoring application server 860 may facilitate communication between the one or more user devices 840, 850 and the monitoring system.

In some implementations, the one or more user devices 840, 850 may be configured to switch whether the one or more user devices 840, 850 communicate with the monitoring system control unit 810 directly (e.g., through link 838) or through the monitoring application server 860 (e.g., through network 805) based on a location of the one or more user devices 840, 850. For instance, when the one or more user devices 840, 850 are located close to the monitoring system control unit 810 and in range to communicate directly with the monitoring system control unit 810, the one or more user devices 840, 850 use direct communication. When the one or more user devices 840, 850 are located far from the monitoring system control unit 810 and not in range to communicate directly with the monitoring system control unit 210, the one or more user devices 840, 850 use communication through the monitoring application server 860.

Although the one or more user devices 840, 850 are shown as being connected to the network 805, in some implementations, the one or more user devices 840, 850 are not connected to the network 805. In these implementations, the one or more user devices 840, 850 communicate directly with one or more of the monitoring system components and no network (e.g., Internet) connection or reliance on remote servers is needed.

In other implementations, the system 800 further includes network 805 and the sensors 820, the module 822, the camera 830, the thermostat 834, and the connected water meter 880 is configured to communicate sensor, image data, or both to the one or more user devices 840, 850 over network 805 (e.g., the Internet, cellular network, etc.). In yet another implementation, the sensors 820, the module 822, the camera 830, the thermostat 834, and the connected water meter 880 (or a component, such as a bridge/router) are intelligent enough to change the communication pathway from a direct local pathway when the one or more user devices 840, 850 are in close physical proximity to the sensors 820, the module 822, the camera 830, the thermostat 834, and the connected water meter 880 to a pathway over network 805 when the one or more user devices 840, 850 are farther from the sensors 820, the module 822, the camera 830, the thermostat 834, and the connected water meter 880. In some examples, the system leverages GPS information from the one or more user devices 840, 850 to determine whether the one or more user devices 840, 850 are close enough to the sensors 820, the module 822, the camera 830, the thermostat 834, and the connected water meter 880 to use the direct local pathway or whether the one or more user devices 840, 850 are far enough from the sensors 820, the module 822, the camera 830, the thermostat 834, and the connected water meter 880 that the pathway over network 805 is required. In other examples, the system leverages status communications (e.g., pinging) between the one or more user devices 840, 850 and the sensors 820, the module 822, the camera 830, the thermostat 834, and the connected water meter 880 to determine whether communication using the direct local pathway is possible. If communication using the direct local pathway is possible, the one or more user devices 840, 850 communicate with the sensors 820, the module 822, the camera 830, the thermostat 834, and the connected water meter 880 using the direct local pathway. If communication using the direct local pathway is not possible, the one or more user devices 840, 850 communicate with the sensors 820, the module 822, the camera 830, the thermostat 834, and the connected water meter 880 using the pathway over network 805.

The invention claimed is:

1. A method for identifying one or more appliances configured to use water, the method comprising:
   obtaining one or more water usage profiles, wherein each water usage profile of the one or more water usage profiles indicates water usage of a respective appliance;
   obtaining water consumption data from one or more water sensors indicating first water usage at a property;
   obtaining motion sensor data from one or more motion sensors;
   selecting combinations of appliances for inclusion in a set of appliance combinations that are candidates for using water, each selected combination of appliances including two or more appliances for which a combination of the respective water usage profiles matches the first water usage within a threshold difference;
   identifying, from the set of appliance combinations and using the motion sensor data, a particular combination of appliances from among the selected combinations of appliances that is using water; and
   generating a notification for presentation on a user device, the notification indicating that the particular combination of appliances is using water.

2. The method of claim 1, wherein obtaining the one or more water usage profiles comprises accessing a database of water usage profiles, wherein each water usage profile of the one or more water usage profiles in the database includes data indicating a type of appliance associated with the water usage profile.

3. The method of claim 1, wherein selecting the combinations of appliances for inclusion in the set of appliance combinations that are candidates for using water comprises:
   determining, using the water consumption data, a time-varying amplitude of water consumption at the property;
   identifying one or more water usage profiles that, when aggregated, match the time-varying amplitude of water consumption at the property within a predetermined amount of error; and
   selecting a combination of the appliances that correspond to the identified one or more water usage profiles for inclusion in the set of appliance combinations that are candidates for using water.

4. The method of claim 1, wherein identifying the particular combination of appliances that is using water comprises:
   identifying the particular combination of appliances that is using water from among the set of appliance combinations that are candidates for using water based on an analysis of (i) the motion sensor data (ii) second sensor data obtained from one or more second sensors installed at the property that are different than the one or more motion sensors, wherein the one or more second sensors include one or more of a contact sensor, an energy sensor, or a camera.

5. The method of claim 1, wherein the one or more water usage profiles each include a template that describes water usage of a particular appliance with respect to a particular time period.

6. The method of claim 1, wherein the one or more water usage profiles each include a water consumption curve representing time-varying water usage of a respective appliance during operation of the respective appliance.

7. The method of claim 1, wherein obtaining water consumption data from one or more water sensors indicating the first water usage at the property includes:
   receiving, by a water meter analytics unit and from a connected water meter, data describing aggregate water consumption at the property for a particular time period.

8. The method of claim 1, wherein identifying, from the set of appliance combinations and using the motion sensor data, the particular combination of appliances that is using water comprises:
   determining, using the motion sensor data, that a first appliance included in the set of appliance combinations is not using water; and
   removing, from the set of appliance combinations that are candidates for using water, one or more appliance combinations that include the first appliance.

9. The method of claim 8, wherein determining, using the motion sensor data, that a first appliance included in the set of appliance combinations is not using water comprises:
   detecting, based on the motion sensor data, a lack of motion in an area of the property in which the first appliance is located.

10. The method of claim 9, wherein detecting the lack of motion in the area of the property in which the first appliance is located comprises determining that an amount of motion detected in the area of the property in which the first appliance is located does not satisfy motion detection criteria for human movement.

11. The method of claim 1, wherein identifying, from the set of appliance combinations and using the motion sensor data, the particular combination of appliances that is using water comprises iteratively:
   identifying, using the motion sensor data, appliances included in the set of appliance combinations that are not using water; and
   removing, from the set of appliance combinations that are candidates for using water, any appliance combinations that include the identified appliances.

12. The method of claim 1, comprising:
   determining, based on identifying the particular combination of appliances that is using water, that an abnormal water consumption event is occurring, wherein the notification indicates that the abnormal water consumption event is occurring.

13. The method of claim 1, comprising:
   determining, based on identifying the particular combination of appliances that is using water, that an inefficient water consumption event is occurring, wherein the notification indicates that the inefficient water consumption event is occurring.

14. A system for identifying one or more appliances configured to use water, the system comprising one or more processors and one or more computer storage media storing instructions that are operable, when executed by the one or more processors, to cause the one or more processors to perform operations comprising:

obtaining one or more water usage profiles, wherein each water usage profile of the one or more water usage profiles indicates water usage of a respective appliance;

obtaining water consumption data from one or more water sensors indicating first water usage at a property;

obtaining motion sensor data from one or more motion sensors;

selecting combinations of appliances for inclusion in a set of appliance combinations that are candidates for using water, each selected combination of appliances including two or more appliances for which a combination of the respective water usage profiles matches the first water usage within a threshold difference;

identifying, from the set of appliance combinations and using the motion sensor data, a particular combination of appliances from among the selected combinations of appliances that is using water; and generating a notification for presentation on a user device, the notification indicating that the particular combination of appliances is using water.

15. The system of claim 14, wherein selecting the combinations of appliances for inclusion in the set of appliance combinations that are candidates for using water comprises:

determining, using the water consumption data, a time-varying amplitude of water consumption at the property;

identifying one or more water usage profiles that, when aggregated, match the time-varying amplitude of water consumption at the property within a predetermined amount of error; and selecting a combination of the appliances that correspond to the identified one or more water usage profiles for inclusion in the set of appliance combinations that are candidates for using water.

16. The system of claim 14, wherein identifying the particular combination of appliances that is using water comprises:

identifying the particular combination of appliances that is using water from among the set of appliance combinations that are candidates for using water based on an analysis of (i) the motion sensor data and (ii) second sensor data obtained from one or more second sensors installed at the property that are different than the one or more motion sensors, wherein the one or more second sensors include one or more of a contact sensor, an energy sensor, or a camera.

17. The system of claim 14, wherein identifying, from the set of appliance combinations and using the motion sensor data, the particular combination of appliances that is using water comprises:

determining, using the motion sensor data, that a first appliance included in the set of appliance combinations is not using water; and removing, from the set of appliance combinations that are candidates for using water, one or more appliance combinations that include the first appliance.

18. The system of claim 17, wherein determining, using the motion sensor data, that a first appliance included in the set of appliance combinations is not using water comprises:

detecting, based on the motion sensor data, a lack of motion in an area of the property in which the first appliance is located.

19. The system of claim 18, wherein detecting the lack of motion in the area of the property in which the first appliance is located comprises determining that an amount of motion detected in the area does not satisfy motion detection criteria for human movement.

20. A non-transitory computer-readable medium storing software comprising instructions executable by one or more computers which, upon such execution, cause the one or more computers to perform operations comprising:

obtaining one or more water usage profiles, wherein each water usage profile of the one or more water usage profiles indicates water usage of a respective appliance configured to use water;

obtaining water consumption data from one or more water sensors indicating first water usage at a property;

obtaining motion sensor data from one or more motion sensors;

selecting combinations of appliances for inclusion in a set of appliance combinations that are candidates for using water, each selected combination of appliances including two or more appliances for which a combination of the respective water usage profiles matches the first water usage within a threshold difference;

identifying, from the set of appliance combinations and using the motion sensor data, a particular combination of appliances from among the selected combinations of appliances that is using water; and generating a notification for presentation on a user device, the notification indicating that the particular combination of appliances is using water.

* * * * *